United States Patent
Liu et al.

(10) Patent No.: US 11,678,276 B2
(45) Date of Patent: Jun. 13, 2023

(54) AUTOMATIC GAIN CONTROL FOR CO-EXISTENCE OF SLOT-BASED AND SUB-SLOT-BASED PHYSICAL SIDELINK SHARED CHANNELS

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Yisheng Xue, San Diego, CA (US); Peter Gaal, San Diego, CA (US); Tao Luo, San Diego, CA (US); Jung Ho Ryu, Fort Lee, NJ (US); Sony Akkarakaran, Poway, CA (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/444,034

(22) Filed: Jul. 29, 2021

(65) Prior Publication Data
US 2023/0032794 A1 Feb. 2, 2023

(51) Int. Cl.
| | | |
|---|---|---|
| *H04B 7/185* | (2006.01) |
| *H04W 52/52* | (2009.01) |
| *H04W 72/02* | (2009.01) |
| *H04J 13/00* | (2011.01) |
| *H04W 72/1263* | (2023.01) |
| *H04W 72/0446* | (2023.01) |

(52) U.S. Cl.
CPC ......... *H04W 52/52* (2013.01); *H04J 13/0029* (2013.01); *H04J 13/0062* (2013.01); *H04W 72/02* (2013.01); *H04W 72/0446* (2013.01); *H04W 72/1263* (2013.01)

(58) Field of Classification Search
CPC ... H04W 5/52; H04W 72/02; H04W 72/0446; H04W 72/1263
See application file for complete search history.

(56) References Cited

U.S. PATENT DOCUMENTS

| | | | |
|---|---|---|---|
| 10,231,132 B2 * | 3/2019 | Zhang | H04L 5/0091 |
| 11,516,692 B2 * | 11/2022 | Lee | H04W 64/00 |
| 2016/0249297 A1 * | 8/2016 | Oh | H04W 76/14 |
| 2019/0007910 A1 * | 1/2019 | Akula | H04W 52/365 |
| 2019/0394786 A1 * | 12/2019 | Parron | H04L 27/0006 |
| 2020/0100230 A1 * | 3/2020 | Lee | H04W 72/048 |
| 2020/0146000 A1 * | 5/2020 | Shin | H03G 3/3089 |
| 2020/0351136 A1 * | 11/2020 | Hwang | H04L 1/0061 |
| 2020/0413407 A1 * | 12/2020 | Gulati | H04B 17/21 |
| 2021/0105104 A1 * | 4/2021 | Cao | H04L 5/0005 |
| 2021/0212096 A1 * | 7/2021 | Hassan Hussein | H04W 24/08 |
| 2022/0110096 A1 * | 4/2022 | Lin | H04B 17/318 |

* cited by examiner

*Primary Examiner* — Abdelnabi O Musa
(74) *Attorney, Agent, or Firm* — Haynes and Boone LLP

(57) ABSTRACT

Wireless communications systems and methods related to communicating control information are provided. A method of wireless communication performed by a user equipment (UE) may include mapping a power reservation signal of a sub-slot resource pool (RP) to an AGC symbol location of a slot RP and transmitting, to at least one other UE, the power reservation signal, wherein a transmit power level of the power reservation signal is based on an estimated transmit power level associated with at least one sub-slot.

30 Claims, 11 Drawing Sheets

AUTOMATIC GAIN CONTROL FOR CO-EXISTENCE OF SLOT-BASED AND SUB-SLOT-BASED PHYSICAL SIDELINK SHARED CHANNELS

TECHNICAL FIELD

This application relates to wireless communication systems, and more particularly to methods and devices for wireless communication using sub-slot-based physical sidelink shared channels.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE) may include mapping a power reservation signal of a sub-slot resource pool (RP) to an AGC symbol location of a slot RP; and transmitting, to at least one other UE, the power reservation signal, wherein a transmit power level of the power reservation signal is based on an estimated transmit power level associated with at least one sub-slot.

In an additional aspect of the disclosure, a method of communication performed by a UE may include receiving, from another UE, a power reservation signal of a sub-slot resource pool (RP) in an AGC symbol location of a slot RP, wherein the power reservation signal comprises a combing a plurality of waveforms associated with a plurality of sub-slots; and estimating, based on the received power reservation signal and a waveform of the plurality of waveforms, a power level for each sub-slot of the plurality of sub-slots.

In an additional aspect of the disclosure, a method of communication performed by a base station (BS) may include identifying a first user equipment (UE) that causes interference to a second UE; and transmitting, to the first UE, a message instructing the first UE to transmit a power reservation signal in an AGC symbol location of a slot resource pool (RP) based on the first UE causing interference to the second UE.

In an additional aspect of the disclosure, a UE may include a transceiver, a memory, and a processor coupled to the transceiver and the memory, the UE may be configured to map a power reservation signal of a sub-slot resource pool (RP) to an AGC symbol location of a slot RP; and transmit, to at least one other UE, the power reservation signal, wherein a transmit power level of the power reservation signal is based on an estimated transmit power level associated with at least one sub-slot.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
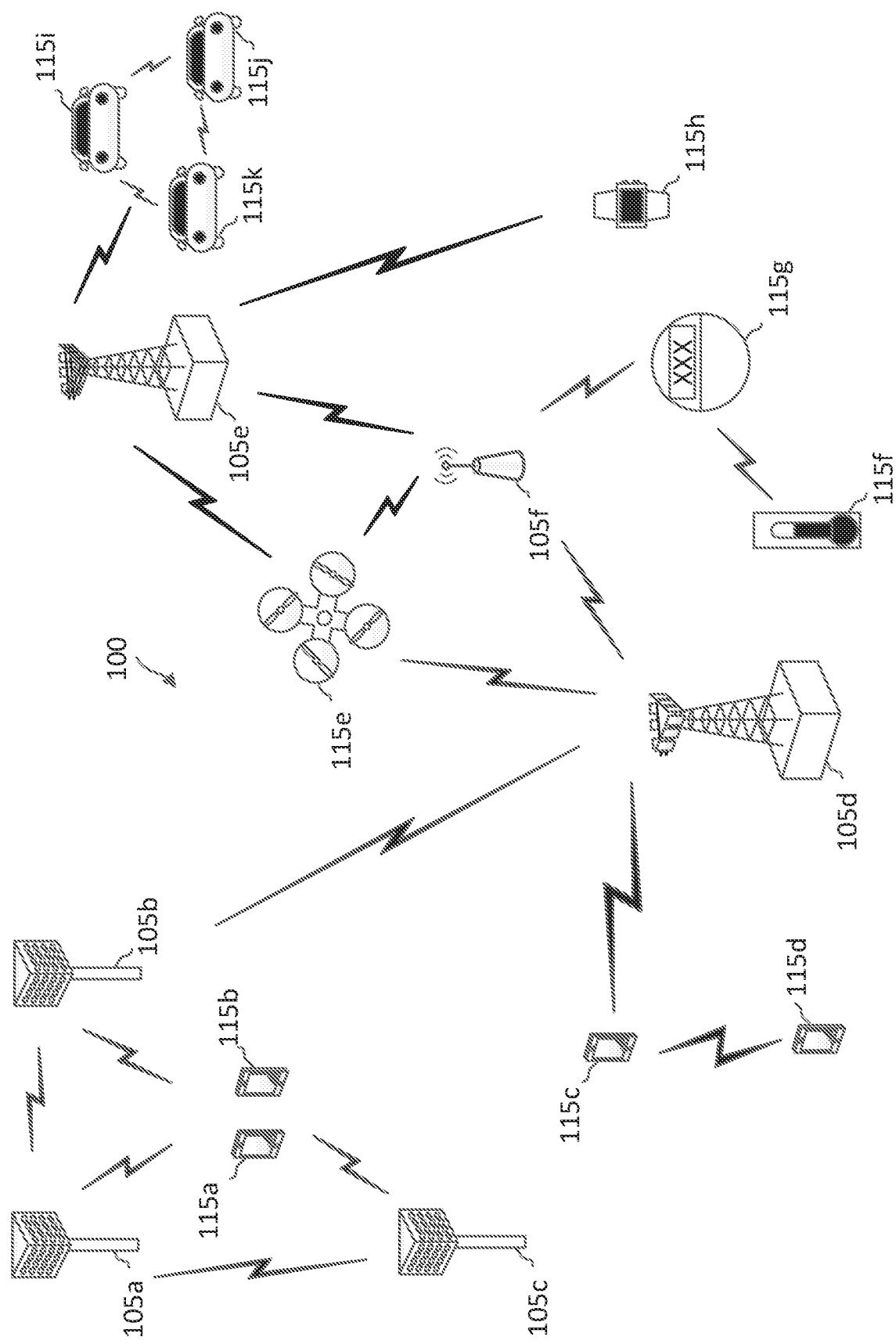
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for multiple UEs to map a power reservation signal of a sub-slot resource pool (RP) to an AGC symbol location of a slot RP. The present application further describes mechanisms for UEs to transmit, to other UEs, the power reservation signal, wherein a transmit power level of the power reservation signal is based on an estimated transmit power level associated with at least one sub-slot. The disclosed approaches include various methods of mapping the power reservation signal.

In some aspects of the present disclosure, the interference to a slot-based UE caused by a sub-slot-based UE, may be reduced by the sub-slot-based UE transmitting the power reservation signal in an AGC symbol location of the slot-based UE as compared to the sub-slot-based UE transmitting a signal in a symbol location other than the AGC symbol location of the slot-based UE.

In some aspects of the present disclosure, the size of transport blocks transmitted in a sub-slot by sub-slot-based UEs may be increased by transmitting the power reservation signal in an AGC symbol location of the slot-based UE as compared to transmitting an AGC signal in a sub-slot of a slot.

In accordance with the present disclosure, partitioning a slot into multiple sub-slots and mapping a power reservation signal of a sub-slot RP to an AGC symbol location of a slot RP may facilitate more efficient use and optimization of the frequency resources, higher reliability of the wireless communications network, and reduced transmission latency. In this regard, wireless communication applications requiring low latency such as vehicle-to-everything (V2X) and industrial Internet-of-Things (IoT) may benefit from the methods and devices of the present disclosure.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a vehicle (e.g., a car, a truck, a bus, an autonomous vehicle, an aircraft, a boat, etc.). Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, the UE 115g (e.g., a meter, a programmable logic controller, an IoT device, a robot, a vehicle, etc.) may map a power reservation signal of a sub-slot resource pool (RP) to an AGC symbol location of a slot RP. In some aspects, a radio frame may include a plurality of time slots in the time domain. Each of the time slots may be referred to as a slot. A slot may include a plurality of time symbols (e.g., OFDM symbols) which may be used in a sidelink transmission. For example, a slot may include 14 symbols. A slot may be partitioned into sub-slots. Each of the sub-slots may include at least one symbol. In this regard, each sub-slot may include 2, 3, 4, 5 or more symbols. Each of the sub-slots may be used in a sidelink transmission. For example, the UE 115 may partition a slot into a plurality of sub-slots and transmit a TB and/or padding in each of the sub-slots to a different UE. The UE 115g may be a sub-slot-based UE 115. In some aspects, the network (e.g., the network 100 or 200) may include a mix of both UEs that support the sub-slot structure (e.g., the sub-slot-based UEs 115) and legacy UEs that do not support the sub-slot structure, but support the slot structure (e.g., the slot-based UEs 115). In this case of mixed UEs, a sub-slot-based UE 115 may transmit the power reservation signal to reduce interference effects on slot-based UE 115 that receive TBs based on a slot structure. The sub-slot-based UE 115g may transmit the power reservation signal in the AGC symbol location of the slot RP to at least one slot-based UE 115. In this manner, the slot-based UE 115 may set a gain control of a receiver or a receiver portion of a transceiver based at least on the power reservation signal.

In some aspects, the BS 105f may identify a sub-slot-based UE 115 that causes interference to a slot-based UE 115. The BS 105f may transmit to the identified sub-slot-based UE 115, a message instructing the sub-slot-based UE 115 to transmit a power reservation signal in an AGC symbol location of a slot RP based on the sub-slot-based UE 115 causing interference to the slot-based UE 115. The BS 105f may identify the sub-slot-based UE 115 that causes interference to the slot-based UE 115 based on a network topology including the sub-slot-based UE 115 and the slot-based UE 115.

Figure 2:
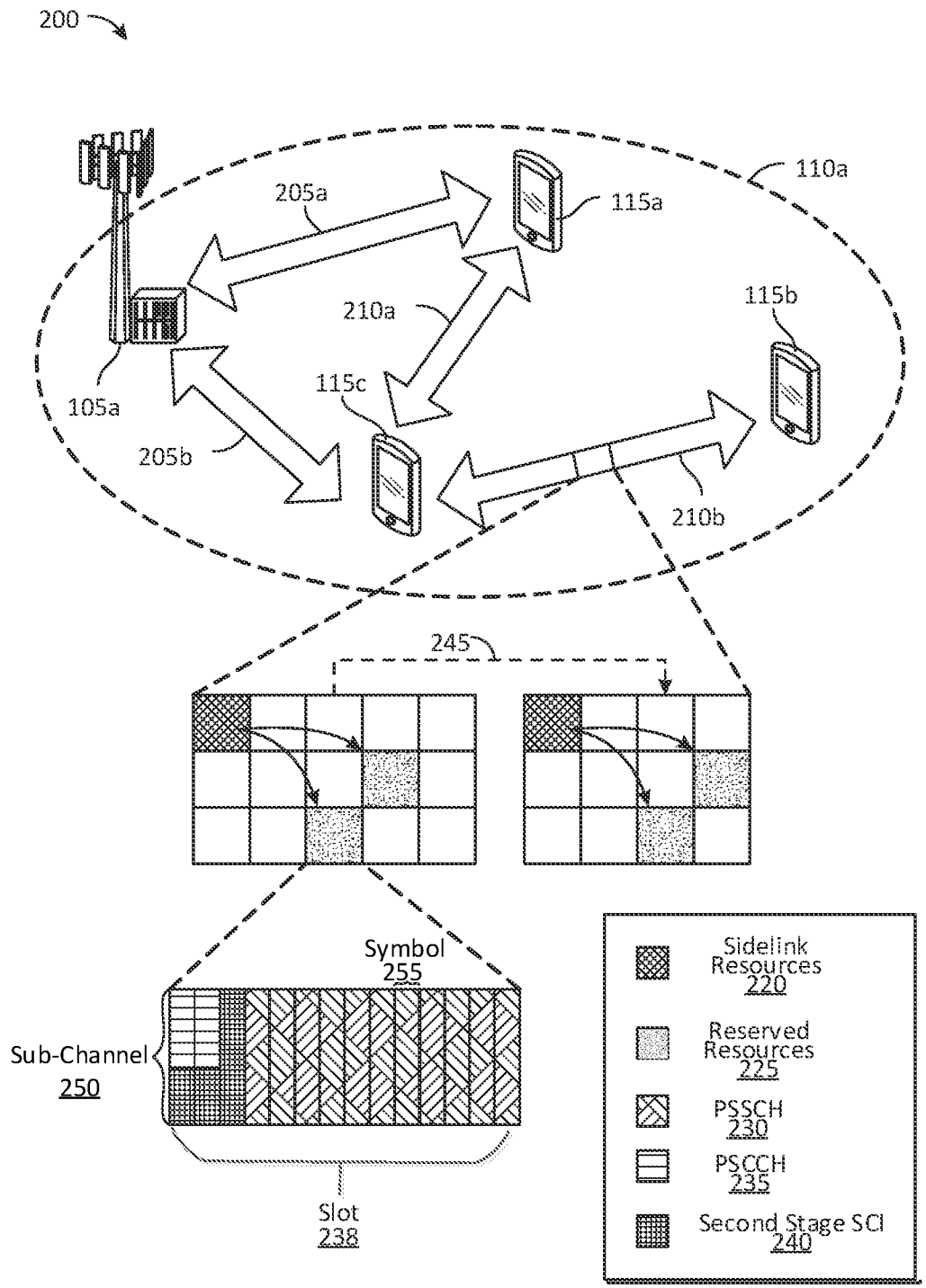
FIG. 2 illustrates sidelink resources associated with a wireless communication network according to some aspects of the present disclosure.

FIG. 2 illustrates sidelink resources associated with a wireless communication network 200 according to some aspects of the present disclosure. The wireless communications network 200 may include a base station 105a and UEs 115a, 115b, and 115c, which may be examples of a BS 105 and a UE 115 as described with reference to FIG. 1. Base station 105a and UEs 115a and 115c may communicate within geographic coverage area 110a and via communication links 205a and 205b, respectively. UE 115c may communicate with UEs 115a and 115b via sidelink communication links 210a and 210b, respectively. In some examples, UE 115c may transmit SCI to UEs 115a and 115b via the sidelink control resources 220. The SCI may include an indication of resources reserved for retransmissions by UE 115c (e.g., the reserved resources 225). In some examples, UEs 115a and 115b may determine to reuse one or more of the reserved resources 225.

In some aspects, a device in the wireless communication network 200 (e.g., a UE 115, a BS 105, or some other node) may convey SCI to another device (e.g., another UE 115, a BS 105, sidelink device or vehicle-to-everything (V2X) device, or other node). The SCI may be conveyed in one or more stages. The first stage SCI may be carried on the PSCCH while the second stage SCI may be carried on the corresponding PSSCH. For example, UE 115c may transmit a PSCCH/first stage SCI 235 (e.g., SCI-1) to each sidelink UE 115 in the network (e.g., UEs 115a and 115b) via the sidelink communication links 210. The PSCCH/first stage SCI-1 235 may indicate resources that are reserved by UE 115c for retransmissions (e.g., the SCI-1 may indicate the reserved resources 225 for retransmissions). Each sidelink UE 115 may decode the first stage SCI-1 to determine where the reserved resources 225 are located (e.g., to refrain from using resources that are reserved for another sidelink transmission and/or to reduce resource collision within the wireless communications network 200). Sidelink communication may include a mode 1 operation in which the UEs 115 are in a coverage area of BS 105a. In mode 1, the UEs 115 may receive a configured grant from the BS 105a that defines parameters for the UEs 115 to access the channel Sidelink communication may also include a mode 2 operation in which the UEs 115 operate autonomously from the BS 105a and perform sensing of the channel to gain access to the channel. In some aspects, during mode 2 sidelink operations, the sidelink UEs 115 may perform channel sensing to locate resources reserved by other sidelink transmissions. The first stage SCI-1 may reduce the need for sensing each channel. For example, the first stage SCI-1 may include an explicit indication such that the UEs 115 may refrain from blindly decoding each channel. The first stage SCI-1 may be transmitted via the sidelink control resources 220. The sidelink control resources 220 may be configured resources (e.g., time resources or frequency resources) transmitted via a PSCCH 235. In some examples, the PSCCH 235 may be configured to occupy a number of physical resource blocks (PRBs) within a selected frequency. The frequency may include a single subchannel 250 (e.g., 10, 12, 15, 20, 25, or some other number of RBs within the subchannel 250). The time duration of the PSCCH 235 may be configured by the BS 105a (e.g., the PSCCH 235 may span 1, 2, 3, or some other number of symbols 255).

The first stage SCI-1 may include one or more fields to indicate a location of the reserved resources 225. For example, the first stage SCI-1 may include, without limitation, one or more fields to convey a frequency domain resource allocation (FDRA), a time domain resource allocation (TDRA), a resource reservation period 245 (e.g., a period for repeating the SCI transmission and the corresponding reserved resources 225), a modulation and coding scheme (MCS) for a second stage SCI-2 240, a beta offset value for the second stage SCI-2 240, a DMRS port (e.g., one bit indicating a number of data layers), a physical sidelink feedback channel (PSFCH) overhead indicator, a priority, one or more additional reserved bits, or a combination thereof. In some examples, the FDRA may be a number of bits in the first stage SCI-1 that may indicate a number of slots and a number of subchannels reserved for the reserved resources 225 (e.g., a receiving UE 115 may determine a location of the reserved resources 225 based on the FDRA by using the subchannel 250 including the PSCCH 235 and first stage SCI-1 as a reference). The TDRA may be a number of bits in the first stage SCI-1 (e.g., 5 bits, 9 bits, or some other number of bits) that may indicate a number of time resources reserved for the reserved resources 225. In this regard, the first stage SCI-1 may indicate the reserved resources 225 to the one or more sidelink UEs 115 in the wireless communication network 200.

The sidelink UEs 115 may attempt to decode the reserved resources 225 indicated by the first stage SCI-1. In some aspects, the reserved resources 225 may be used for retransmission of sidelink data or the first stage SCI-1. Additionally or alternatively, the reserved resources 225 may include resources for sidelink transmissions, such as a PSSCH 230. The slot 238 as shown in FIG. 2 is not partitioned into sub-slots. As described below with reference to FIG. 3, the slot 238 may be partitioned into multiple sub-slots. The sub-slots may be transmitted via PSSCH 230 using one or more symbols 255. In some examples, the PSSCH 230 may be transmitted via one or more time or frequency resources via one or more full or partial symbols 255. A second stage SCI-2 240 may be transmitted via one or more symbols 255 of the PSSCH 230. The second stage SCI-2 240 may be transmitted in a symbol(s) near or at the beginning of a slot. The second stage SCI-2 240 may include an indication of which of the reserved resources 225 the transmitting UE 115 may use for sidelink transmissions. The second stage SCI-2 240 may thereby be received and decoded by sidelink UEs 115 intended to receive and decode the corresponding sidelink communications.

In some aspects, the transmitting UE 115 may transmit first-stage SCI-1 to one or more receiving UEs 115 indicating whether multiple sub-slots are enabled or disabled for the slot 238. If multiple sub-slots are enabled for the slot 238, at least one of the sub-slot-based UEs 115 may transmit, to at least one slot-based UE 115, a power reservation signal in an AGC symbol location (e.g., the earliest symbol in time) of the slot-based UE 115. The transmit power level of the power reservation signal may be based on an estimated transmit power level associated with at least one sub-slot. The slot-based UE 115 may set a gain control of a receiver or a receiver portion of a transceiver based at least on the power reservation signal.

Figure 3:
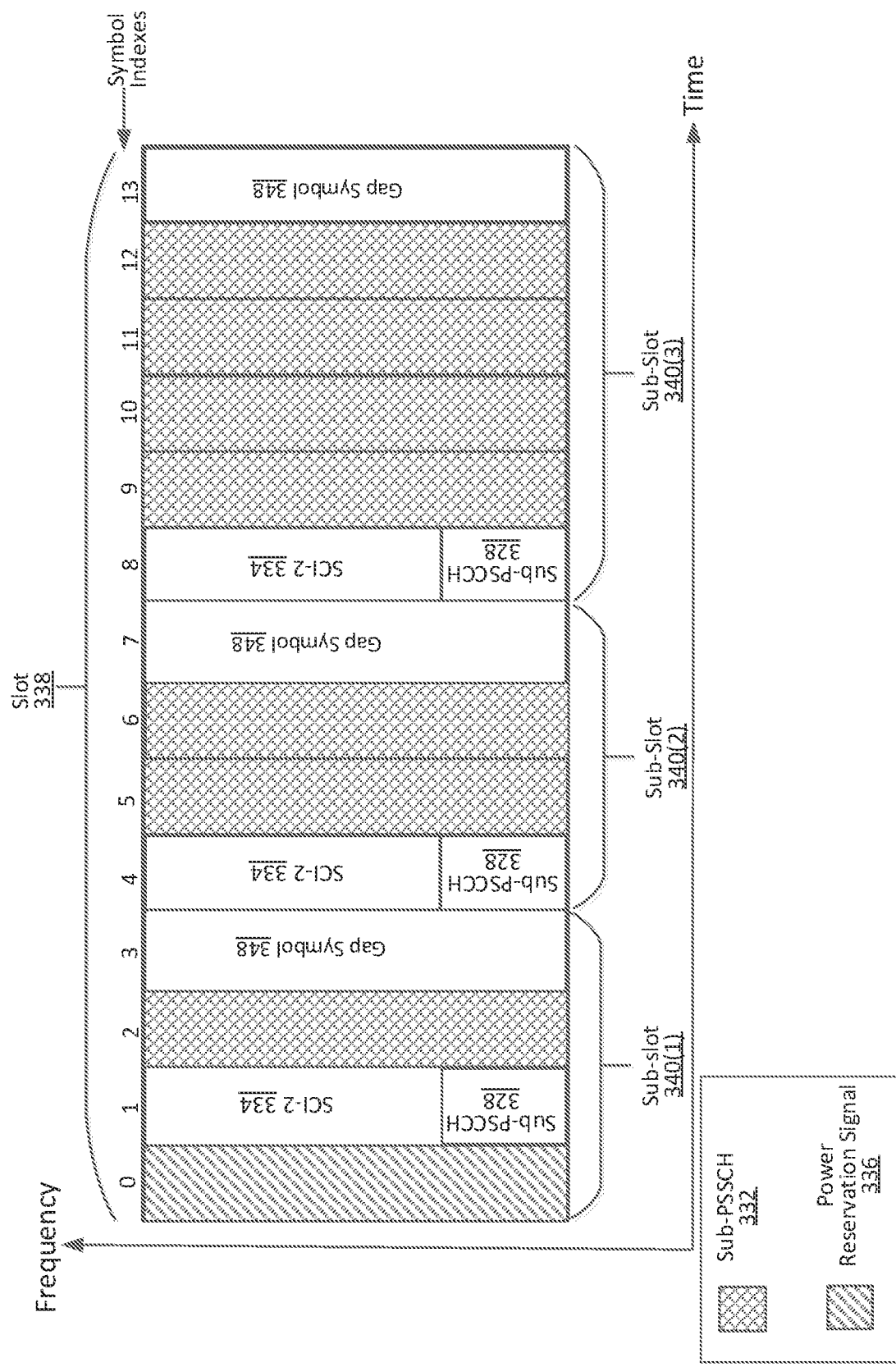
FIG. 3 illustrates a slot partitioned into sub-slots according to some aspects of the present disclosure.

FIG. 3 illustrates a slot 338 partitioned into sub-slots 340 according to some aspects of the present disclosure. In FIG. 3, the x-axis represents time in some arbitrary units and the Y-axis represents frequency in some arbitrary units. In some aspects, the UE (e.g., the UE 115, the UE 700) may map a sub-PSSCH 332, a sub-PSCCH 328, and an SCI-2 334 to any or all of the sub-slots 340 in the slot 338. The sub-PSSCH 332 may carry a TB and/or an SCI-2 similar to a PSSCH. However, in contrast to a PSSCH, the sub-PSSCH 332 may carry a TB and/or SCI-2 in a sub-slot 340. Each of the plurality of sub-slots may include the PSSCH 332 to carry a TB and/or an SCI-2. The sub-PSCCH 328 may carry an SCI-1 similar to a PSCCH. However, in contrast to a PSCCH, the sub-PSCCH 328 may an SCI-1 in a sub-slot 340. Each of the plurality of sub-slots may include the PSCCH328 to carry an SCI-1. In some instances, each of the sub-PSSCHs 332, sub-PSCCHs 328, and SCIs 334 mapped in a sub-slot 340 may be used by a different UE 115 to transmit a TB to a different UE 115 over a sidelink channel. In this manner, the UEs 115 may increase the utilization of time/frequency resources within the slot 338 as compared to a single UE 115 transmitting a TB to a single UE 115 in the slot 338.

By partitioning the slot 338 into the plurality of sub-slots 340(1) . . . 340(3), each sub-slot 340 may be utilized by a different UE 115 to transmit a TB, facilitating the transmission of multiple TBs by multiple UEs 115 in a single slot 338. In some instances, the UE 115 may be a leading UE 115 that receives a sub-slot partitioning configuration from a BS (e.g., BS 105 or BS 800). The UE 115 may receive a resource pool (RP) configuration from the BS 105 that defines the RP for the sub-slots 340. In this regard, the UE 115 may receive the sub-slot 340 and/or RP configurations in an RRC message and/or a DCI message (e.g., a DCI-3 signal, DCI-1 signal). The leading UE 115 may partition the slot 338 into a plurality of sub-slots 340 based on the sub-slot configuration and/or the RP configuration. The leading UE 115 may transmit the sub-slot structure to the following UEs 115. In some instances, the UE 115 communicates the sub-slot structure to the following UEs 115 in SCI. In some aspects, the leading UE 115 may transmit a TB in the leading sub-slot 340(1) (e.g., the earliest sub-slot in time) of the plurality of sub-slots 340 defined for the slot 338. The UE 115 may transmit the SCI with the sub-slot structure to the following UEs 115 in the leading sub-slot 340(1). The leading UE 115 may assign each of the following UEs 115 a particular sub-slot 340 of the plurality of sub-slots 340(1) . . . 340(3) in which the following UE 115 may transmit a TB. In some instances, the leading UE 115 may indicate the assignment of the following UEs 115 to the sub-slots 340 in the sub-slot structure communicated in the SCI.

In some aspects, the UE 115 partitions the slot 338 such that each sub-slot 340 occupies multiple symbols within the slot 338. For example, a slot 338 may include 2, 3, 4, or more sub-slots. In some instances, a slot may include 14 symbols. A sub-slot 340 may occupy 2, 3, 4, 5, 6, or more symbols. In some aspects, each sub-slot 340 may occupy contiguous symbols within the slot 338. In this regard, each sub-slot 340 may occupy groups of symbols that are contiguous in time. The group of contiguous symbols may include any number of symbols contained within the slot 338. Referring to FIG. 3, the sub-slot 340(1) may occupy symbol indexes 0-3. The sub-slot 340(2) may occupy symbol indexes 4-7. The sub-slot 340(3) may occupy symbol indexes 8-13, or any other group of contiguous symbols within the slot 338. The number of symbols occupying the sub-slot 338 may be based on the size of the TB to be transmitted. A larger TB may require more symbols than a smaller TB.

In some aspects, the sub-slot-based UE 115 may map a power reservation signal 336 to the leading sub-slot 340(1) of the slot 338. A sub-slot-based UE 115 may transmit a TB in a sub-PSSCH 332. The signal strength of the sub-PSSCH 332 may cause interference to a slot-based UE 115. The level of interference caused by the sub-slot-based UE 115 transmitting the sub-PSSCH 332 may be based on a distance between the sub-slot-based UE 115 and the slot-based UE 115. A higher level of interference may be caused by a sub-slot-based UE 115 that is closer to the slot-based UE 115 than a sub-slot-based UE 115 that is farther away from the slot-based UE 115. The power reservation signal 336 may be used by the slot-based UE 115 to adjust the strength of the received signal in order to reduce a quantization error at the analog to digital converter of the receiving slot-based UE 115. In some instances, the power reservation signal 336 may help a slot-based UE's receiver to adjust the gain of a front-end amplifier. In some aspects, the sub-slot-based UE 115 may map the power reservation signal 336 to the leading symbol (e.g., the earliest symbol, symbol index 0) in the sub-slot 340. The sub-slot-based UE 115 may map the power reservation signal 336 to the leading symbol in order for the slot-based UE 115 to properly set the gain of the amplifier and mitigate the interference caused by the transmissions of the sub-slot-based UE 115.

In some aspects, the UE 115 may map a sub-PSSCH 332 to each sub-slot 340 of the slot 338. Each sub-PSSCH 332 of each sub-slot 340 may occupy one or more symbols. The sub-PSSCHs 332 may carry one or more transport blocks (TBs) that include the data to be communicated by a transmitting UE 115. The number of symbols the sub-PSSCH 332 occupies may be based on the size of the TB. As described above, in accordance with the present disclosure, each sub-slot 340 may be utilized by a different UE 115 to transmit the TB(s). In some aspects, the UE 115 may only map a power reservation signal 336 to the leading symbol of the leading sub-slot 340(1). In the case in which only the leading sub-slot 340(1) of the slot 338 includes a power reservation signal 336, the following sub-slots 340(2) and 340(3) (e.g., the non-leading sub-slots) may omit the AGC symbol and locate a PSCCH and/or a PSSCH in place of the AGC symbol. By replacing the AGC symbol in the non-leading sub-slot with a PSCCH and/or a PSSCH, the receiving sub-slot-based UEs 115 may use the power reservation signal 336 to set the gain of their respective receiver or receiver portion of a transceiver. Using this method, the sub-slot-based UEs 115 may increase the number of symbols in the sub-slot 340 available for carrying a TB compared to sub-slots 340 that include an AGC symbol. Increasing the number of symbols in the sub-slot 340 available for carrying a TB may increase the capacity of the wireless network.

In some aspects, the UE 115 may map a gap symbol 348 (e.g., a guard period) to each sub-slot 340 of the slot 338. The gap symbol 348 of each sub-slot 340 may occupy a full symbol. In some instances, the UE 115 may map the gap symbol 348 to an ending symbol (e.g., a trailing symbol) of the sub-slot 340. For example, the UE 115 may map the gap symbol 348 to the ending symbols 3, 7, and 13 in sub-slots 340(1), 340(2), and 340(3), respectively. The gap symbol 348 may be used for timing adjustments and/or for allowing UEs 115 to switch between transmission and reception. In some instances, the UE 115 may map the gap symbol 348 to an ending symbol (e.g., a trailing symbol) of the trailing sub-slot 340(3) only. In this case, the UE 115 may omit the gap symbol 348 in sub-slots 340(1) and 340(2).

In some aspects, the UE 115 may map an SCI to each sub-slot 340 of the slot 338. The SCI may include a first-stage SCI-1 and/or a second-stage SCI-2. Splitting the SCI in two stages (first-stage SCI-1 and second-stage SCI-2) may allow UEs 115 to decode the first-stage SCI-1 for channel sensing purposes, such as determining the resources reserved by other transmissions. The second-stage SCI-2 may provide additional control information that allows the UE 115 to receive and decode a transmission. In this regard, the UE 115 may transmit the SCI-1 to another UE 115 in a physical sidelink control channel (PSCCH) 328. Referring to FIG. 3, the leading UE 115 may transmit the sub-slot structure to the following UEs 115 in the sub-PSCCHs 328. The SCI-1 carried by the sub-PSCCH 328 may include a beta offset associated with an SCI-2 carried by sub-PSSCH 332. The SCI-1 may include a modulation and encoding scheme (MCS) of the sub-PSSCH 332. The SCI-1 may include resource assignments for at least one sub-slot 340 of the plurality of sub-slots 340(1) . . . 340(3) of a slot 338 and/or resource assignments for at least one sub-slot 340 of another slot (e.g., a future slot). The resource assignments for the current slot 338 or for a future slot may be used by transmitting UE(s) 115 for retransmissions of TB(s) that are not successfully decoded by receiving UE(s) 115. The UEs 115 may be operating in a sidelink mode 1 in which the leading UE 115 receives the resource assignments from a serving BS (e.g., the BS 105 or BS 800). The leading UE 115 may transmit the resource assignments to the following UEs 115 in the SCI-1 carried by the sub-PSCCHs 328.

In some aspects, the UE 115 may transmit the SCI-2 334 to another UE 115 in a sub-PSSCH 332. The SCI-2 334 may include information used for decoding the sub-PSSCH 332 and for supporting HARQ feedback. The SCI-2 may include a UE 115 source ID and a UE 115 destination ID associated with a TB. The SCI-2 may also include a one-bit new data indicator (NDI) that is used to specify whether the TB sent in the sub-PSSCH 332 corresponds to the transmission of new data or a retransmission.

In some aspects, the UE 115 may transmit a sub-PSSCH 332 in a sub-slot 340 that includes at least one demodulation reference signal (DMRS). A DMRS may be a reference signal used by the receiving UE(s) 115 for channel estimation and/or compensating for Doppler effects at high UE speeds.

Figure 4:
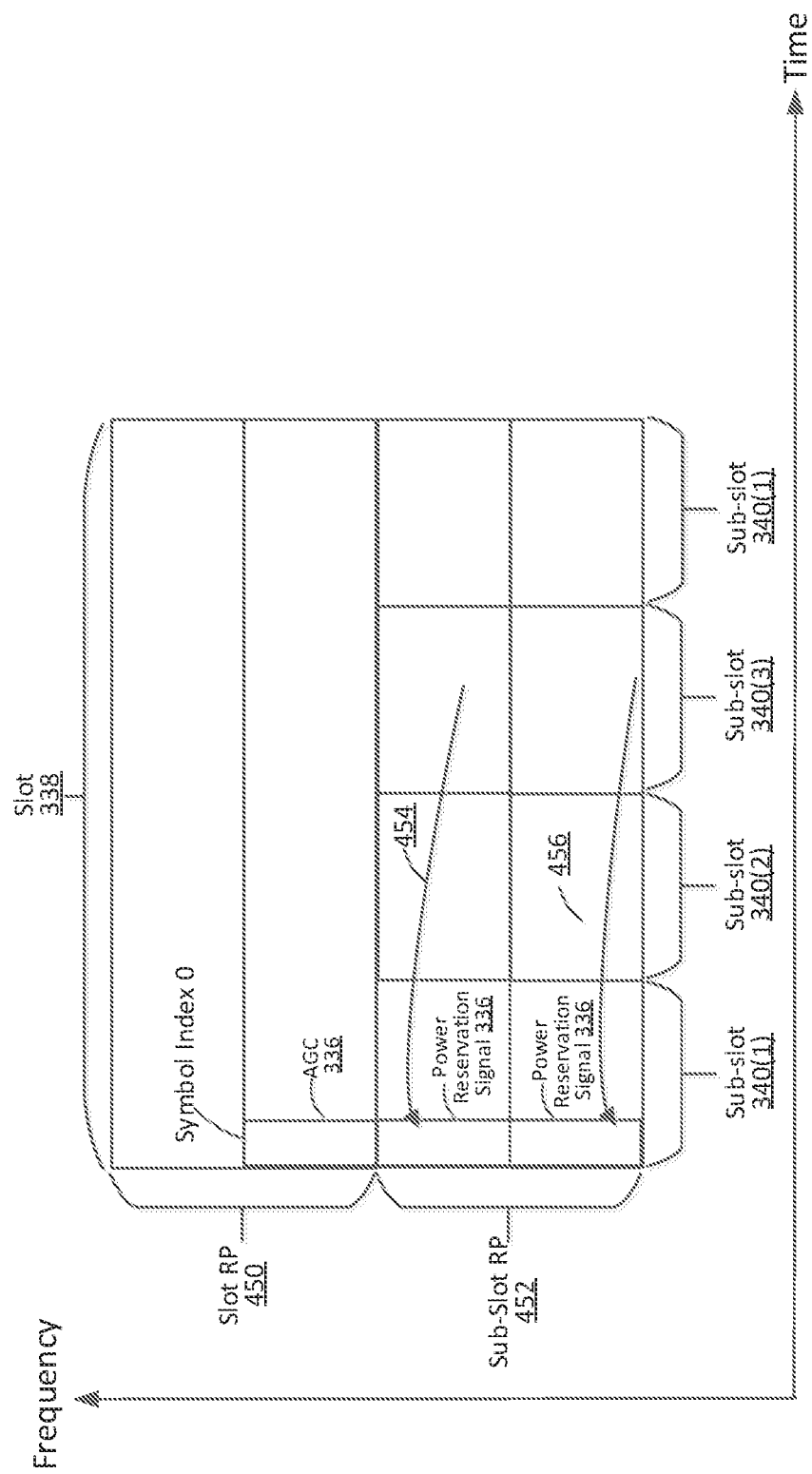
FIG. 4 illustrates a power reservation signal mapped to an AGC symbol location of a slot according to some aspects of the present disclosure.

FIG. 4 illustrates a power reservation signal 336 mapped to an AGC symbol location 337 of a slot 338 according to some aspects of the present disclosure. In FIG. 4, the x-axis represents time in some arbitrary units and the Y-axis represents frequency in some arbitrary units. In some aspects, a UE (e.g., the UE 115 or the UE 700) may map a power reservation signal 336 of a sub-slot RP 452 to an AGC symbol location 337 of a slot RP 450. In some aspects, the UE 115 may map the power reservation signal 336 to a leading symbol location (e.g., symbol index 0) of a leading sub-slot 340(1) of a plurality of sub-slots 340(1) . . . 340(3) in the slot 338. In some instances, the leading symbol location of the leading sub-slot 340(1) of the plurality of sub-slots 340(1) . . . 340(3) in the slot 338 may coincide in time with the AGC symbol location 337 of the slot RP 450. The leading symbol of the sub-slot 340(1) may be the first symbol (e.g., the earliest symbol in time) of the sub-slot 340(1). The leading symbol may be symbol index 0.

In some aspects, the UE may partition the slot 338 into a plurality of sub-slots 340(1) . . . 340(3). By partitioning the slot 338 into the plurality of sub-slots 340 (1) . . . 340(3), each sub-slot 340 may be utilized by a different UE 115 to transmit a TB, facilitating the transmission of multiple TBs by multiple UEs 115 in a single slot 338. In some instances, the UE 115 may be a sub-slot-based UE 115 that receives a sub-slot partitioning configuration from a BS (e.g., BS 105 or BS 800). The sub-slot-based UE 115 may receive the sub-slot RP 452 configuration from the BS 105 that defines the sub-slot RP 452 for the sub-slots 340. The sub-slot-based UE 115 may partition the slot 338 into a plurality of sub-slots 340(1) . . . 340(3) based on the sub-slot RP 452 configuration. In some instances, the sub-slot-based UE 115 may transmit the sub-slot structure to the other sub-slot-based UEs 115. In some instances, the sub-slot-based UE 115 that partitions the slot 338 into the plurality of sub-slots 340 (1) . . . 340(3) and/or transmits the sub-slot structure to other sub-slot-based UEs 115 may be referred to as a leading UE 115. In some instances, the sub-slot-based UEs 115 that receive the sub-slot structure from the leading sub-slot-based UE 115 may be referred to as following UEs 115. In some instances, the leading sub-slot-based UE 115 may assign each of the following sub-slot-based UEs 115 a particular sub-slot 340 of the plurality of sub-slots 340 (1) . . . 340(3) in which the following sub-slot-based UE 115 may transmit a TB. In some instances, the following sub-slot-based UEs 115 may transmit during sub-slots 340 following the leading sub-slot 340(1) of the plurality of sub-slots 340 (1) . . . 340(3). In some instances, the leading sub-slot-based UE 115 indicates the sub-slot assignments of the following sub-slot-based UEs 115 in sidelink control information (SCI).

In some aspects, the sub-slot-based UE 115 may map the power reservation signal 336 of the sub-slot RP 452 to the AGC symbol location 337 of the slot RP 450 by mapping the power reservation signal 336 based on waveforms associated with a subset of sub-slots 340 of the plurality of sub-slots 340 (1) . . . 340(3). For example, a sub-slot-based UE 115 mapped to sub-slot 340(2) may estimate a power level associated with a transmission intended for sub-slot 340(2) in a first frequency or frequency range. As indicated by arrow 456, the sub-slot-based UE 115 mapped to sub-slot 340(2) may transmit a power reservation signal 336 in symbol index 0 based on the estimated power level. The sub-slot-based UE 115 mapped to sub-slot 340(2) may transmit the power reservation signal 336 in symbol index 0 using the first frequency or frequency range. As another example, a sub-slot-based UE 115 mapped to sub-slot 340 (3) may estimate a power level associated with a transmission intended for sub-slot 340(3) in a second frequency or frequency range. As indicated by arrow 454, the sub-slot-based UE 115 mapped to sub-slot 340(3) may transmit a power reservation signal 336 in symbol index 0 based on the estimated power level. The sub-slot-based UE 115 mapped to sub-slot 340(3) may transmit the power reservation signal 336 in symbol index 0 using the second frequency or frequency range.

Figure 5:
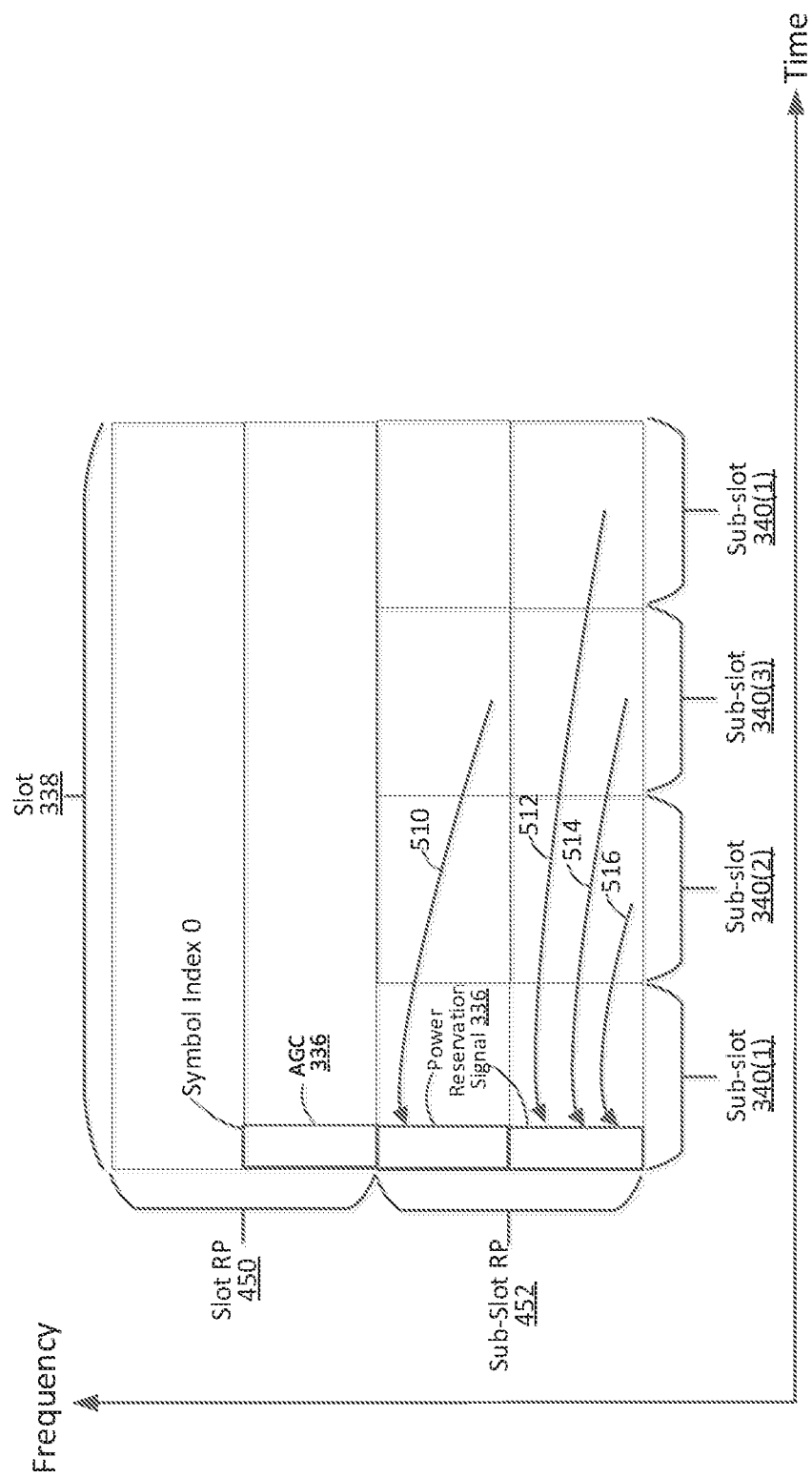
FIG. 5 illustrates a combing of a power reservation signal mapped to an AGC symbol location of a slot according to some aspects of the present disclosure.

FIG. 5 illustrates a combing of a power reservation signal 336 mapped to an AGC symbol location 337 of the slot 338 according to some aspects of the present disclosure. In FIG. 5, the x-axis represents time in some arbitrary units and the Y-axis represents frequency in some arbitrary units. In some aspects, the sub-slot-based UE 115 may comb the waveforms associated with a plurality of sub-slots 340(1) . . . 340(3) using any suitable method. For example, the sub-slot-based UE 115 may comb a waveform associated with at least one sub-slot 340 into the power reservation signal 336 based on frequency division multiplexing. The sub-slot-based UE 115 may comb the waveforms by mapping a waveform associated with at least one sub-slot 340 to one or more frequencies. For example, the sub-slot-based UE 115 may map a first waveform to a first frequency or frequency range in the AGC symbol location 337, map a second waveform to a second frequency or frequency range in the AGC symbol location 337, map a third waveform to a third frequency or frequency range in the AGC symbol location 337, etc. Each of the frequencies or frequency ranges may be adjacent to the next frequency or frequency range. For example, as indicated by arrow 516, a waveform associated with sub-slot 340(2) may be mapped to the first frequency or frequency range in power reservation signal 336. The waveform associated with sub-slot 340(2) may be adjacent to the second frequency or frequency range. As indicated by arrow 514, a waveform associated with sub-slot 340(3) may be mapped to the second frequency or frequency range in power reservation signal 336 adjacent to the first frequency or frequency range. The second frequency or frequency range may be adjacent to the third frequency or frequency range. As indicated by arrow 512, a waveform associated with sub-slot 340(4) may be mapped to the third frequency or frequency range in power reservation signal 336 adjacent to the second frequency or frequency range. Each of the frequencies or frequency ranges may include one or more resource elements, subcarriers, subchannels, channels, bands, etc. In some aspects, the sub-slot RP 452 may be partitioned on a subchannel basis. For example, sub-slot 340(3) may include frequency resources in adjacent subchannels. As indicated by arrow 510, a waveform associated with sub-slot 340(3) may be mapped to power reservation signal 336 in a subchannel adjacent to the subchannel that includes the combed waveforms indicated by arrows 512, 514, and 516.

In some aspects, the sub-slot-based UE 115 may comb the waveforms by repeating a comb pattern every x frequencies or frequency ranges (e.g., 2, 3, 4, 5, 6, 8, 10, 12, or other number of frequencies or frequency ranges) for y sub-slots (e.g., 2, 3, 4, 5, 6, or other number of sub-slots), where x and y may be the same or different values. The comb pattern may include an interleaving, an interweaving, or an interlacing of the frequencies or frequency ranges. For example, the AGC symbol location 337 may include twelve frequencies or frequency ranges (e.g., indexed 0 to 11). In some instances, the sub-slot-based UE 115 may partition a slot into four sub-slots 340(1) . . . 340(4). Accordingly, in some aspects the sub-slot-based UE 115 may comb (e.g., interleave, interweave, interlace) the waveforms by mapping the twelve frequencies or frequency ranges of the AGC symbol location 337 to at least one of the four sub-slots 340(1) . . . 340(4) using a repeating pattern. For example, the first sub-slot 340(1) waveform may occupy frequency indexes 0, 4, and 8. The second sub-slot 340(2) waveform may occupy frequency indexes 1, 5, and 9. The third sub-slot 340(3) waveform may occupy frequency indexes 2, 6, and 10. The fourth sub-slot 340(4) waveform may occupy frequency indexes 3, 9, and 11. As another example, the first sub-slot 340(1) waveform may occupy frequency indexes 0, 1, and 2. The second sub-slot 340(2) waveform may occupy frequency indexes 3, 4, and 5. The third sub-slot 340(3) waveform may occupy frequency indexes 6, 7, and 8. The fourth sub-slot 340(4) waveform may occupy frequency indexes 9, 10, and 11. As another example, the first sub-slot 340(1) waveform may occupy frequency indexes 6, 7, and 8. The second sub-slot 340(2) waveform may occupy frequency indexes 9, 10, and 11. The third sub-slot 340(3) waveform may occupy frequency indexes 0, 1, and 2. The fourth sub-slot 340(4) waveform may occupy frequency indexes 3, 4, and 5. The sub-slot-based UE 115 may comb the waveforms using different mappings in other instances. In some aspects, the sub-slot-based UE 115 may receive, from the BS 105, one or more combing parameters for combing (e.g., interleaving, interweaving, interlacing) the waveforms. In this regard, the sub-slot-based UE 115 may receive the one or more combing parameters from the BS 105 in a unicast DCI3 message and/or a groupcast DCI3 message. In some instances, the combing parameter(s) may include the frequencies that the waveforms of the sub-slots 340 may occupy.

In some aspects, the sub-slot-based UE 115 that maps the power reservation signal 336 of the sub-slot RP 452 to the AGC symbol location 337 of the slot RP 450 may map the power reservation signal 336 based on a cyclic shift of the plurality of waveforms associated with the plurality of sub-slots 340(1) . . . 340(4). The sub-slot-based UE 115 may cyclic shift the waveforms associated with a plurality of sub-slots 340(1) . . . 340(4) using any suitable method. For example, the sub-slot-based UE 115 may cyclic shift a waveform associated with each sub-slot 340 into the power reservation signal 336 based on multiplexing. The sub-slot-based UE 115 may cyclic shift the waveforms by mapping each waveform associated with a sub-slot 340 to one or more cyclic shifts. For example, the sub-slot-based UE 115 may map a first waveform to a first cyclic shift in the AGC symbol location 337, map a second waveform to a second cyclic shift in the AGC symbol location 337, map a third waveform to a third cyclic shift in the AGC symbol location 337, etc. In some aspects, the number of cyclic shift lengths (e.g., two, three, or more) may alternate between the sub-slots 340. Additionally or alternatively, each sub-slot 340 may have a different cyclic shift length. In some aspects, each sub-slot 340 of the plurality of sub-slots 340(1) . . . 340(4) may be associated with particular frequencies, a particular number of frequencies, a subchannel, a subcarrier, a particular number of frequency ranges, and/or a particular cyclic shift. In some aspects, the sub-slot-based UE 115 may receive, from the BS 105, one or more cyclic shift parameters for the waveforms. In this regard, the sub-slot-based UE 115 may receive the one or more cyclic shift parameters from the BS 105 in a unicast DCI3 message and/or a groupcast DCI3 message.

In some aspects, the power reservation signal 336 may comprise a waveform. The power reservation signal 336 may comprise any suitable type of waveform. For example, the power reservation signal 336 may include a waveform having a peak to average power ratio (PAPR) below a threshold. The threshold may be set such that a waveform having a PAPR below the threshold may facilitate a suitable gain setting for the slot-based UE's receiver or receiver portion of a transceiver (e.g., the receiver or receiver portion of a transceiver of the slot-based UE 115 that is subject to the interference by the sub-slot-based UE 115). The PAPR may be the ratio of the peak power (e.g., the maximum power) to the average power of the waveform signal. The PAPR may be the ratio of the maximum power of an OFDM symbol to the average power over the symbol period. In some aspects, the power reservation signal may include a Zadoff-Chu sequence waveform. When applied to the power reservation signal 336, the Zadoff-Chu sequence waveform, may provide a power reservation signal 336 with a constant amplitude. The constant amplitude may facilitate the slot-based UE 115 to properly adjust the gain of a receiver or a receiver portion of a transceiver.

Figure 6:
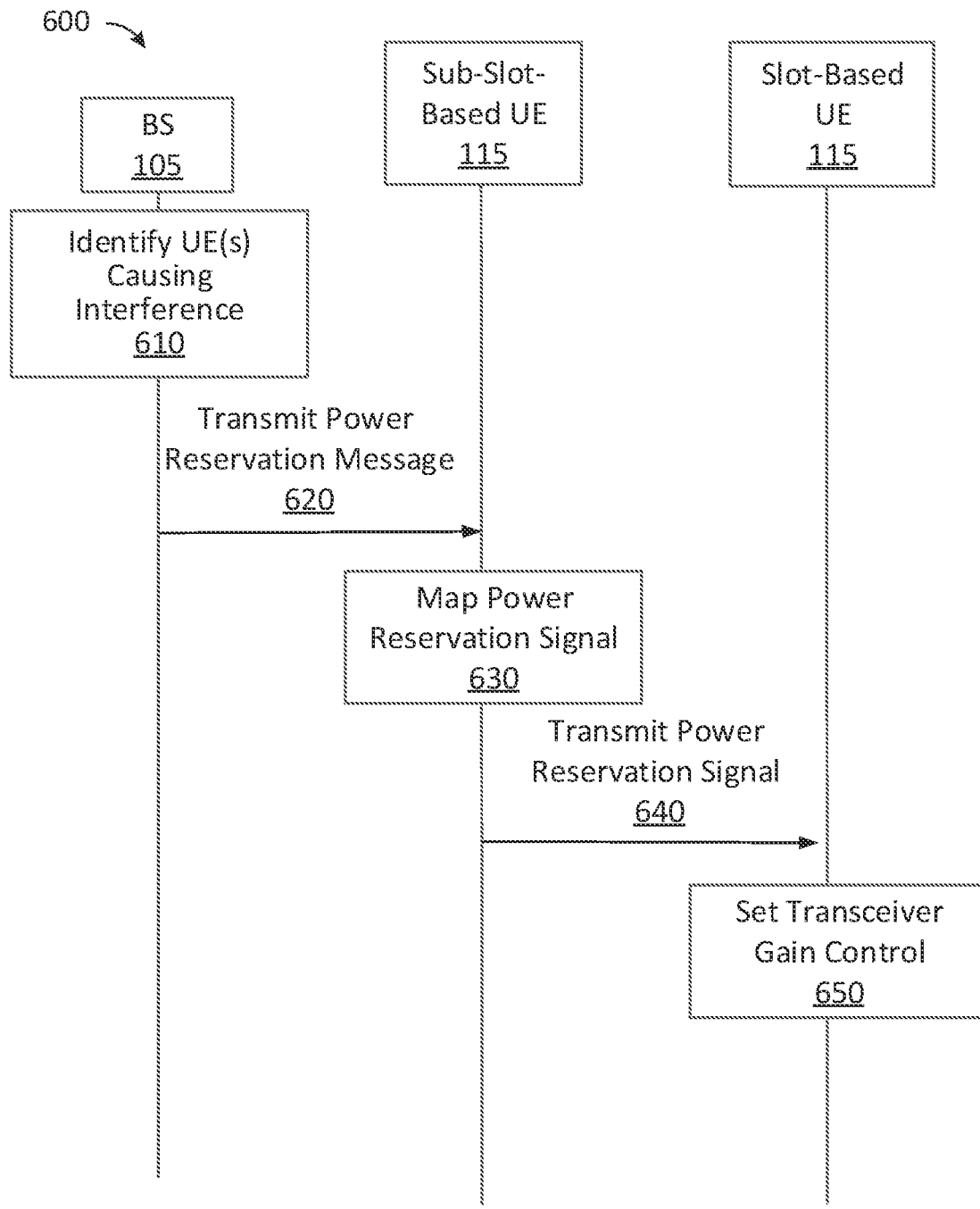
FIG. 6 is a signaling diagram of a communication method according to some aspects of the present disclosure.

FIG. 6 is a signaling diagram 600 of a communication method according to some aspects of the present disclosure. Steps of the signaling diagram 600 can be executed by a computing device (e.g., a processor, processing circuit, and/or other suitable component) of a communication device or other suitable means for performing the steps. For example, a communication device, such as the BS 105 or the BS 800, may utilize one or more components, such as a processor 802, a memory 804, instructions 806, a power reservation signal mapping module 808, a transceiver 810, a modem 812, an RF unit 814, and one or more antennas 816 to execute the steps of signaling diagram 600. A wireless communication device, such as the UE 115 or UE 700, may utilize one or more components, such as the processor 702, the memory 704, the power reservation signal mapping module 708, the transceiver 710, the modem 712, and the one or more antennas 716, to execute signaling diagram 600.

At 610, the BS (e.g., the BS 105 or the BS 800) may identify a sub-slot-based UE 115 that causes interference to a slot-based UE 115. In some aspects, the BS 105 may identify the sub-slot-based UE 115 causing interference to the slot-based UE 115 based on a network topology. The network topology may include a plurality of UEs 115, including the sub-slot-based UE 115 and the slot-based UE 115. For example, the BS 105, the sub-slot-based UE 115, and the slot-based UE 115 may be operating in sidelink mode 1 in which the sub-slot-based UE 115 and the slot-based UE 115 are connected to the BS 105. For example, in some instances, the BS 105 may utilize the physical topology of the network. The physical topology of the network may include the distances between the UEs 115. The interference caused by the sub-slot-based UE 115 to the slot-based UE 115 may be based on the distance between the sub-slot-based UE 115 and the slot-based UE 115. The interference caused by the sub-slot-based UE 115 to the slot-based UE 115 may increase as the distance between the sub-slot-based UE 115 and the slot-based UE 115 decreases. For example, in some instances the BS 105 utilize the spatial relationships between the UEs to identify sub-slot-based UEs 115 that are in closest proximity to a slot-based UEs 115 such that transmissions from those sub-slot-based UEs 115 may cause interference to the slot-based UE 115. The BS 105 may determine the network topology using any method. For example, the BS 105 may receive a location of the sub-slot-based UE 115 and/or the slot-based UE 115 from the sub-slot-based UE 115 and the slot-based UE 115 respectively. In this regard, the BS 105 may receive GPS coordinates from the sub-slot-based UE 115 and/or the slot-based UE 115. Additionally or alternatively, the BS 105 may determine the distance between the sub-slot-based UE 115 and the slot-based UE 115 based on triangulation methods using signal strength measurements of the sub-slot-based UE 115 and the slot-based UE 115 from other nodes in the network.

At 620, the BS 105 may transmit, to the sub-slot-based UE 115, a power reservation message. In some aspects, the BS 105 may transmit, to the sub-slot-based UE 115, a message instructing the sub-slot-based UE 115 to transmit a power reservation signal in an AGC symbol location of a slot RP based on the sub-slot-based UE 115 causing interference to the slot-based UE 115. In this regard, the BS 105 may transmit the message via at least one of a unicast DCI3 message or a multicast DCI3 message. The BS 105 may determine that the sub-slot-based UE 115 may cause interference to the slot-based UE 115 above a threshold. The BS 105 may transmit the message based on the interference being above the threshold. The power reservation message may further include an estimated transmit power level associated with at least one sub-slot of the plurality of sub-slots. The power reservation message may further include an indicator that indicates a frequency associated with at least one sub-slot of the plurality of sub-slots.

At 630, the sub-slot-based UE 115 may map the power reservation signal. In some aspects, the sub-slot-based UE 115 may map the power reservation signal to the AGC symbol location of the slot RP as described above with reference to FIGS. 3-5. The sub-slot-based UE 115 may receive from the BS 105, an indicator that indicates the estimated transmit power level associated with at least one sub-slot of the plurality of sub-slots. The sub-slot-based UE 115 may receive the estimated power level in the power reservation message at 610. As described above, the transmit power level of the power reservation signal may be based on an estimated transmit power level associated with a plurality of sub-slots of a slot. When operating in sidelink mode 1, the sub-slot-based UE 115 may receive the estimated power level of one or more of the plurality of sub-slots from the BS 105. The BS 105 may utilize the spatial relationships between the sub-slot-based UE 115 and the slot-based UE 115 to estimate the power level of the power reservation signal.

In some aspects, the sub-slot-based UE 115 may receive, from the BS 105, an indicator that indicates a frequency associated with at least one sub-slot of the plurality of sub-slots. The sub-slot-based UE 115 may transmit, to the slot-based UE 115, the power reservation signal in the frequency. When operating in sidelink mode 1, the BS 105 may maintain a resource pool indicating the time and frequency resources associated with the sub-slot-based UEs 115 and the slot-based UEs 115. The frequency may include one or more resource elements, subcarriers, subchannels, channels, bands, etc.

At 640, the sub-slot-based UE 115 may transmit the power reservation signal to the slot-based UE 115. The sub-slot-based UE 115 may transmit, to the slot-based UE 115, the power reservation signal at a transmit power level based on an estimated transmit power level associated with at least one sub-slot of the plurality of sub-slots. In some aspects, the network (e.g., the network 100 or 200) may include a mix of both UEs that support the sub-slot structure (e.g., the sub-slot-based UEs 115) and legacy UEs that do not support the sub-slot structure, but support the slot structure (e.g., the slot-based UEs 115). In this case of mixed UEs, a sub-slot-based UE 115 may transmit the power reservation signal to reduce interference effects on slot-based UE 115 that receive TBs based on a slot structure.

At 650, the slot-based UE 115 may set the gain control of a receiver or a receiver portion of a transceiver. In some aspects, when a slot-based RP and a sub-slot-based RP are operating within the same frequency band, a PSCCH and/or a PSSCH transmission by the sub-slot-based UE 115 may cause interference to the slot-based UE 115. The level of interference may be based on a distance between the sub-slot-based transmitting UE 115 and the slot-based receiving UE 115. The slot-based UE 115 may set the gain of its receiver or receiver portion of its transceiver based on an AGC signal received during the first symbol of the slot (e.g., symbol 0). During a later transmission of a PSCCH and/or PSSCH by the sub-slot-based UE 115 in a later sub-slot (e.g., during any of symbols 1-13), the PSCCH and/or PSSCH transmission may be received as interference by the slot-based UE. The unwanted interference added to any communication signal(s) intended for the slot-based UE 115 may cause a saturation and/or clipping of a receiver or a receiver portion of a transceiver of the slot-based UE. In order to address this issue, the power reservation signal transmitted by the sub-slot-based UE 115 in the AGC location of the slot-based UE 115 may facilitate the proper gain setting of the receiver or receiver portion of the transceiver by the slot-based UE 115.

Figure 7:
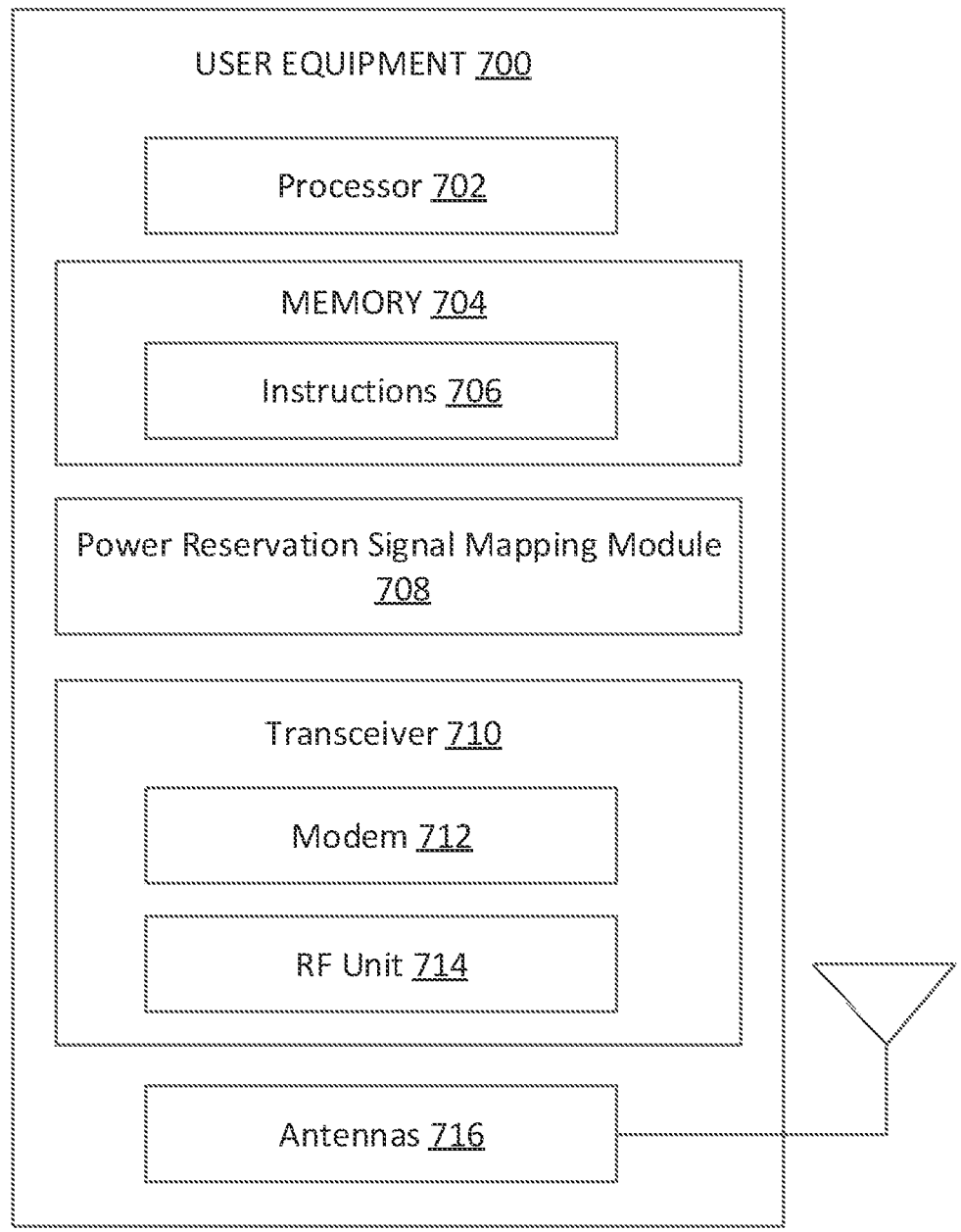
FIG. 7 is a block diagram of an exemplary user equipment (UE) according to some aspects of the present disclosure.

FIG. 7 is a block diagram of an exemplary UE 700 according to some aspects of the present disclosure. The UE 700 may be the UE 115 in the network 100 as discussed above. As shown, the UE 700 may include a processor 702, a memory 704, a power reservation signal mapping module 708, a transceiver 710 including a modem subsystem 712 and a radio frequency (RF) unit 714, and one or more antennas 716. These elements may be coupled with each other and in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 704 includes a non-transitory computer-readable medium. The memory 704 may store instructions 706. The instructions 706 may include instructions that, when executed by the processor 702, cause the processor 702 to perform the operations described herein with reference to the UEs 115 in connection with aspects of the present disclosure, for example, aspects of FIGS. 2-6 and 9-11. Instructions 706 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The power reservation signal mapping module 708 may be implemented via hardware, software, or combinations thereof. For example, the power reservation signal mapping module 708 may be implemented as a processor, circuit, and/or instructions 706 stored in the memory 704 and executed by the processor 702.

The power reservation signal mapping module 708 may be used for various aspects of the present disclosure, for example, aspects of FIGS. 2-6 and 9-11. The power reservation signal mapping module 708 may map a power reservation signal of a sub-slot resource pool (RP) to an AGC symbol location of a slot RP. The power reservation signal mapping module 708 may transmit, to at least one other UE, the power reservation signal, wherein a transmit power level of the power reservation signal is based on an estimated transmit power level associated with at least one sub-slot. In this regard, the processor 702 may execute instructions 706 to map a power reservation signal of a sub-slot RP to an AGC symbol location of a slot RP. The transceiver 710 may transmit, to at least one other UE, the power reservation signal based on an estimated transmit power level associated with at least one sub-slot. The transceiver 710 may be configured to receive, from a base station (BS), an indicator that indicates whether the UE should transmit the power reservation signal. The transceiver 710 may receive, from a base station (BS), an indicator that indicates a frequency associated with at least one sub-slot. In some aspects, the transceiver 710 may receive, from another UE, a power reservation signal of a sub-slot resource pool (RP) in an AGC symbol location of a slot RP, wherein the power reservation signal comprises a combing of a plurality of waveforms associated with a plurality of sub-slots. The processor 702 may execute instructions 706 to estimate, based on the received power reservation signal and a waveform of the plurality of waveforms, a power level for each sub-slot of the plurality of sub-slots. The processor 702 may execute instructions 706 to set, based on the estimated power level for each sub-slot of the plurality of sub-slots, a gain control of the transceiver 710.

As shown, the transceiver 710 may include the modem subsystem 712 and the RF unit 714. The transceiver 710 can be configured to communicate bi-directionally with other devices, such as the BSs 105 and/or the UEs 115. The modem subsystem 712 may be configured to modulate and/or encode the data from the memory 704 and the power reservation signal mapping module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together to enable the UE 700 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The antennas 716 may include multiple antennas of similar or different designs in order to sustain multiple transmission links. The RF unit 714 may configure the antennas 716.

In some instances, the UE 700 can include multiple transceivers 710 implementing different RATs (e.g., NR and LTE). In some instances, the UE 700 can include a single transceiver 710 implementing multiple RATs (e.g., NR and LTE). In some instances, the transceiver 710 can include various components, where different combinations of components can implement RATs.

In some aspects, the processor 702 may be coupled to the memory 704, the power reservation signal mapping module 708, and/or the transceiver 710. The processor 702 and may execute operating system (OS) code stored in the memory 704 in order to control and/or coordinate operations of the power reservation signal mapping module 708 and/or the transceiver 710. In some aspects, the processor 702 may be implemented as part of the power reservation signal mapping module 708

Figure 8:
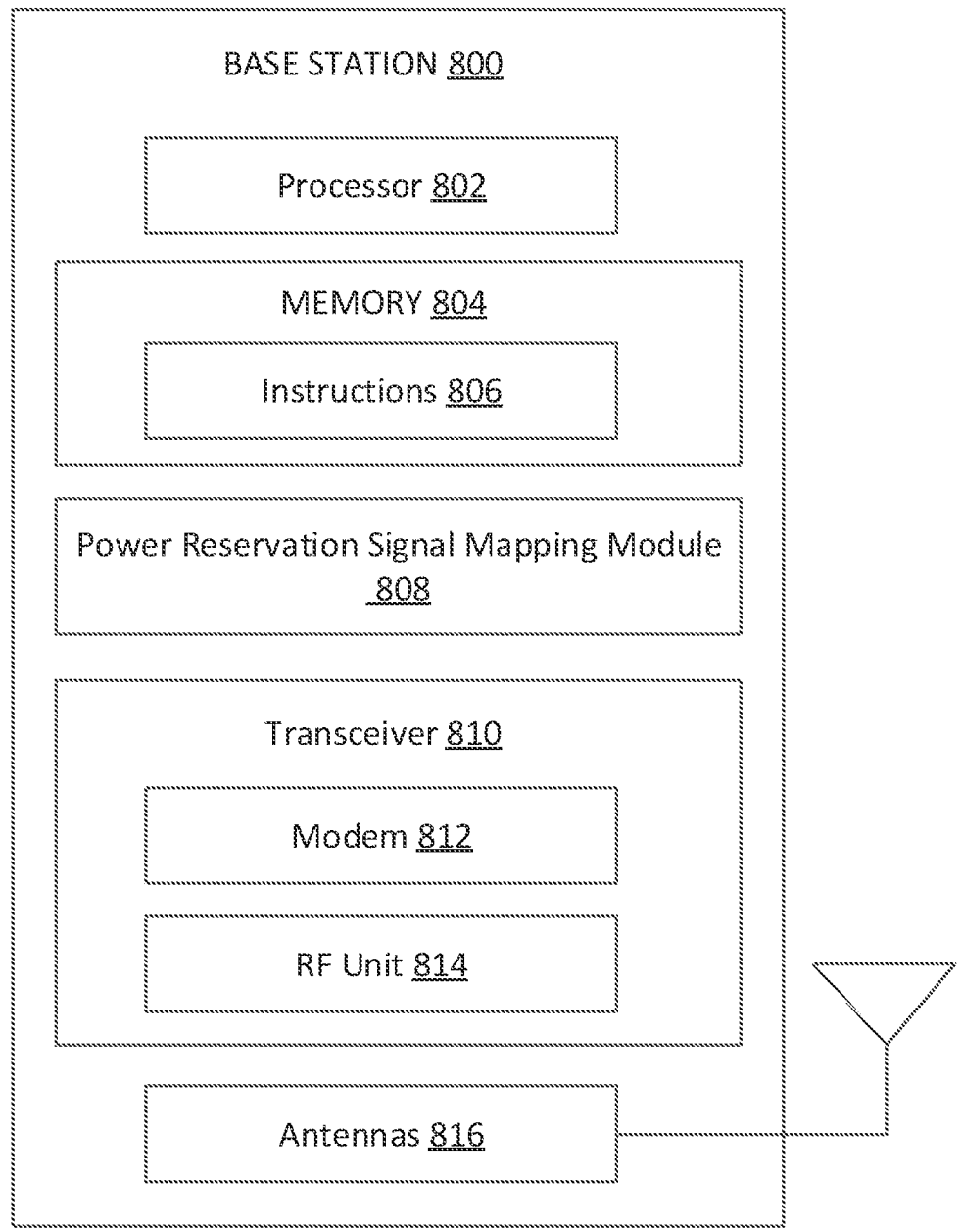
FIG. 8 is a block diagram of an exemplary base station (BS) according to some aspects of the present disclosure.

FIG. 8 is a block diagram of an exemplary BS 800 according to some aspects of the present disclosure. The BS 800 may be a BS 105 as discussed above. As shown, the BS 800 may include a processor 802, a memory 804, a power reservation signal mapping module 808, a transceiver 810 including a modem subsystem 812 and a RF unit 814, and one or more antennas 816. These elements may be coupled with each other and in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 2-6 and 9-11. Instructions 806 may also be referred to as code, which may be interpreted broadly to include any type of computer-readable statement(s).

The power reservation signal mapping module 808 may be implemented via hardware, software, or combinations thereof. For example, the power reservation signal mapping module 808 may be implemented as a processor, circuit, and/or instructions 806 stored in the memory 804 and executed by the processor 802.

The power reservation signal mapping module 808 may be used for various aspects of the present disclosure, for example, aspects of FIGS. 2-6 and 9-11. The power reservation signal mapping module 808 is configured to identify a sub-slot-based UE that causes interference to a slot-based UE. In this regard, the power reservation signal mapping module 808 is configured to identify a sub-slot-based UE that causes interference to a slot-based UE based on a network topology. The power reservation signal mapping module 808 may transmit, to the sub-slot-based UE, a message instructing the sub-slot-based UE to transmit a power reservation signal in an AGC symbol location of a slot RP based on the sub-slot-based UE causing interference to the slot-based UE. In this regard, the transceiver 810 may transmit, to the sub-slot-based UE, a message instructing the sub-slot-based UE to transmit a power reservation signal in an AGC symbol location of a slot RP.

Additionally or alternatively, the power reservation signal mapping module 808 can be implemented in any combination of hardware and software, and may, in some implementations, involve, for example, processor 802, memory 804, instructions 806, transceiver 810, and/or modem 812.

As shown, the transceiver 810 may include the modem subsystem 812 and the RF unit 814. The transceiver 810 can be configured to communicate bi-directionally with other devices, such as the UEs 115 and/or 800. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or UE 700. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, a message instructing the sub-slot-based UE to transmit a power reservation signal in an AGC symbol location of a slot RP according to aspects of the present disclosure. The antennas 816 may further receive data messages transmitted from other devices and provide the received data messages for processing and/or demodulation at the transceiver 810. The antennas 816 may include multiple antennas of similar or different designs in order to sustain multiple transmission links.

In some instances, the BS 800 can include multiple transceivers 810 implementing different RATs (e.g., NR and LTE). In some instances, the BS 800 can include a single transceiver 810 implementing multiple RATs (e.g., NR and LTE). In some instances, the transceiver 810 can include various components, where different combinations of components can implement RATs.

In some aspects, the processor 802 may be coupled to the memory 804, the power reservation signal mapping module 808, and/or the transceiver 810. The processor 802 may execute OS code stored in the memory 804 to control and/or coordinate operations of the power reservation signal mapping module 808, and/or the transceiver 810. In some aspects, the processor 802 may be implemented as part of the power reservation signal mapping module 808.

Figure 9:
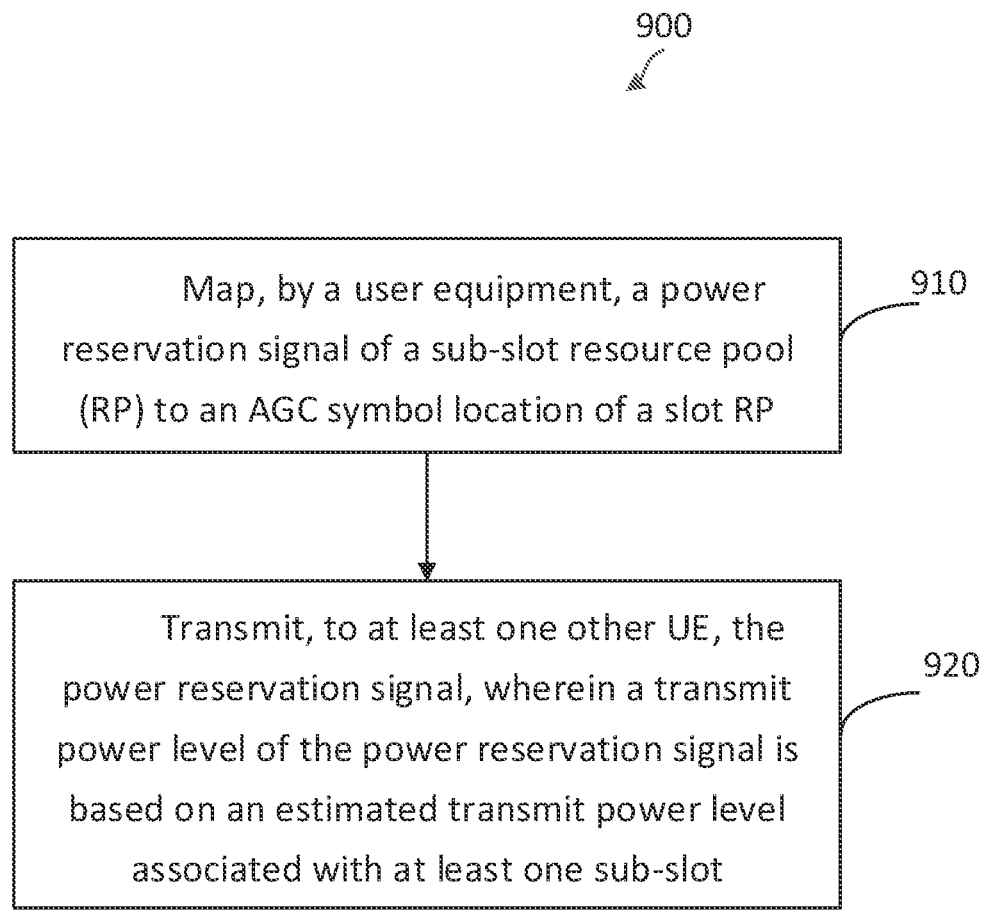
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UE 115 or UE 700, may utilize one or more components, such as the processor 702, the memory 704, the power reservation signal mapping module 708, the transceiver 710, the modem 712, and the one or more antennas 716, to execute aspects of method 900. The method 900 may employ similar mechanisms as in the networks 100 and 200 and the aspects and actions described with respect to FIGS. 2-6. As illustrated, the method 900 includes a number of enumerated steps, but the method 900 may include additional steps before, after, and in between the enumerated steps. In some aspects, one or more of the enumerated steps may be omitted or performed in a different order.

At 910, the method 900 includes a UE (e.g., the UE 115 or the UE 700) mapping a power reservation signal of a sub-slot resource pool (RP) to an AGC symbol location of a slot RP. In some aspects, the UE may map the power reservation signal to a leading symbol location of a leading sub-slot of a plurality of sub-slots in a slot. In some instances, the leading symbol location of the leading sub-slot of the plurality of sub-slots in the slot may coincide in time with the AGC symbol location of the slot RP. The leading symbol of the sub-slot may be the first symbol (e.g., the earliest symbol in time) of the sub-slot. The leading symbol may be symbol index 0.

In some aspects, the UE may partition a slot into a plurality of sub-slots. By partitioning the slot into the plurality of sub-slots, each sub-slot may be utilized by a different UE to transmit a TB, facilitating the transmission of multiple TBs by multiple UEs in a single slot. In some instances, the UE may be a UE that receives a sub-slot partitioning configuration from a BS (e.g., BS 105 or BS 800). The UE may receive a resource pool (RP) configuration from the BS that defines the RP for the sub-slots. The UE may partition the slot into a plurality of sub-slots based on the sub-slot configuration and/or the RP configuration. In some instances, the UE may transmit the sub-slot structure to the other UEs. In some instances, the UE that partitions the slot into the plurality of sub-slots and/or transmits the sub-slot structure to other UEs may be referred to as a leading UE. In some instances, the UEs that receive the sub-slot structure from the leading UE may be referred to as following UEs. In some instances, the leading UE may assign each of the following UEs a particular sub-slot of the plurality of sub-slots in which the following UE may transmit a TB. In some instances, the following UEs will be assigned and transmit during sub-slots following the leading sub-slot of the plurality of sub-slots. In some instances, the leading UE indicates the sub-slot assignments of the following UEs in sidelink control information (SCI).

In some aspects, the UE partitions the slot such that each sub-slot occupies multiple symbols within the slot. For example, a slot may include 2, 3, 4, or more sub-slots. In some instances, a slot may include 14 symbols. A sub-slot may occupy 2, 3, 4, 5, 6, or more symbols. In some aspects, each sub-slot may occupy contiguous symbols within the slot. The group of contiguous symbols may include any number of symbols contained within the slot. The number of symbols occupying the sub-slot may be based on the size of the TB to be transmitted. A larger TB may require more symbols than a smaller TB.

In some aspects, the UE mapping the power reservation signal of the sub-slot RP to the AGC symbol location of the slot RP includes mapping the power reservation signal based on a combing of a plurality of waveforms associated with a plurality of sub-slots. The UE may comb the waveforms associated with a plurality of sub-slots using any suitable method. For example, the UE may comb a waveform associated with each slot into the power reservation signal based on frequency division multiplexing. The UE may comb the waveforms by mapping each waveform associated with a sub-slot to one or more frequencies. For example, the UE may map a first waveform to a first frequency or frequency range in the AGC symbol location, map a second waveform to a second frequency or frequency range in the AGC symbol location, map a third waveform to a third frequency or frequency range in the AGC symbol location, etc. Each of the frequencies or frequency ranges may be adjacent to the next frequency or frequency range. For example, the first frequency or frequency range may be adjacent to the second frequency or frequency range, the second frequency or frequency range may be adjacent to the third frequency or frequency range, etc. Each of the frequencies or frequency ranges may include one or more resource elements, subcarriers, subchannels, channels, bands, etc.

In some aspects, the UE may comb the waveforms by repeating a comb pattern every x frequencies or frequency ranges (e.g., 2, 3, 4, 5, 6, 8, 10, 12, or other number of frequencies or frequency ranges) for y sub-slots (e.g., 2, 3, 4, 5, 6, or other number of sub-slots), where x and y may be the same or different values. For example, the AGC symbol location may include twelve frequencies or frequency ranges (e.g., indexed 0 to 11). In some instances, the UE may partition a slot into four sub-slots. Accordingly, in some aspects the UE may comb the waveforms by mapping the twelve frequencies or frequency ranges of the AGC symbol location to the four sub-slots using a repeating pattern. For example, the first sub-slot waveform may occupy frequency indexes 0, 4, and 8. The second sub-slot waveform may occupy frequency indexes 1, 5, and 9. The third sub-slot waveform may occupy frequency indexes 2, 6, and 10. The fourth sub-slot waveform may occupy frequency indexes 3, 9, and 11. The UE may comb the waveforms using different mappings in other instances. In some aspects, the UE may receive, from the BS, one or more combing parameters for combing the waveforms. In this regard, the UE may receive the one or more combing parameters from the BS in a unicast DCI3 message and/or a groupcast DCI3 message. In some instances, the combing parameter(s) may include the frequencies that the waveforms of the sub-slots may occupy.

In some aspects, the UE mapping the power reservation signal of the sub-slot RP to the AGC symbol location of the slot RP includes mapping the power reservation signal based on a cyclic shift of the plurality of waveforms associated with the plurality of sub-slots. The UE may cyclic shift the waveforms associated with a plurality of sub-slots using any suitable method. For example, the UE may cyclic shift a waveform associated with each sub-slot into the power reservation signal based on multiplexing. The UE may cyclic shift the waveforms by mapping each waveform associated with a sub-slot to one or more cyclic shifts. For example, the UE may map a first waveform to a first cyclic shift in the AGC symbol location, map a second waveform to a second cyclic shift in the AGC symbol location, map a third waveform to a third cyclic shift in the AGC symbol location, etc. In some aspects, a number of cyclic shift lengths (e.g., two, three, or more) may alternate between the sub-slots. Additionally or alternatively, each sub-slot may have a different cyclic shift length. In some aspects, each sub-slot of the plurality of sub-slots may be associated with particular frequencies, a particular number of frequencies, a particular number of frequency ranges, and/or a particular cyclic shift. In some aspects, the UE may receive, from the BS, one or more cyclic shift parameters for the waveforms. In this regard, the UE may receive the one or more cyclic shift parameters from the BS in a unicast DCI3 message and/or a groupcast DCI3 message.

In some aspects, the power reservation signal may comprise a waveform. The power reservation signal may comprise any suitable type of waveform. For example, the power reservation signal may include a waveform having a peak to average power ratio (PAPR) below a threshold. The threshold may be set such that a waveform having a PAPR below the threshold may facilitate a suitable gain setting for the UE's transceiver. The PAPR may be the ratio of the peak power (e.g., maximum power) to the average power of a waveform signal. The PAPR may be the ratio of the maximum power of an OFDM symbol to the average power over the symbol period.

In some aspects, the power reservation signal may include a Zadoff-Chu sequence waveform. When applied to the power reservation signal, the Zadoff-Chu sequence waveform, may provide a power reservation signal with a constant amplitude. The constant amplitude may facilitate the receiving UE properly adjusting the gain of a transceiver of the receiving UE At 920, the UE may transmit, to at least one other UE, the power reservation signal. A transmit power level of the power reservation signal may be based on an estimated transmit power level associated with at least one sub-slot of the plurality of sub-slots. In some aspects, the network (e.g., the network 100 or 200) may include a mix of both UEs that support sub-slot structures (e.g., the slot partitioned into multiple sub-slots) and legacy UEs that do not support the sub-slot structure, but support the slot structure. In this case of mixed UEs, a UE that supports the sub-slot structure may transmit the power reservation signal to reduce interference effects on UEs that receive TBs based on a slot structure. For example, when a slot-based RP and a sub-slot-based RP are within the same frequency band, a PSCCH or PSSCH transmission by a sub-slot-based UE may cause interference to a slot-based UE. The level of interference may be based on a distance between the sub-slot transmitting UE and the slot-based receiving UE. The slot-based UE may set the gain of its receiver or a receiver portion of a transceiver based on an AGC signal received during the first symbol of the slot (e.g., symbol 0). During a later transmission of a PSCCH or PSSCH by a sub-slot UE during a later sub-slot (e.g., during any of symbols 1-13), the PSCCH or PSSCH transmission may be received as interference by the slot-based UE. The unwanted interference added to any communication signal(s) intended for the slot-based UE may cause a saturation and/or clipping of a receiver or a receiver portion of a transceiver of the slot-based UE. In order to address this issue, the power reservation signal transmitted by the sub-slot-based UEs in the AGC location of the slot-based UEs may facilitate the proper gain setting of the receiver or a receiver portion of a transceiver by the slot-based UE.

When operating in sidelink mode 2, each of the UEs intending to transmit in respective sub-slots of the slot may transmit a power reservation signal during the AGC symbol (e.g., the leading symbol, symbol index 0) of the slot-based UEs. Each of the UEs intending to transmit in respective sub-slots of the slot may estimate the power level that they will use for transmitting in the respective sub-slots and transmit the power reservation signal in the leading symbol using the estimated power level. In some aspects, each of the UEs intending to transmit in the respective sub-slots may transmit the power reservation signal using a subset of resource elements in the leading symbol. Each of the UEs intending to transmit in the respective sub-slots may transmit the power reservation signal in a different set of resource elements in the leading symbol. In some aspects, the UE may receive, from a base station (BS), an indicator that indicates the resources the UE may use to transmit the power reservation signal. In this regard, the UE may receive the indicator from the BS in an RRC message and/or a DCI message (e.g., a unicast DCI3 message and/or a groupcast DCI3 message).

In some aspects, the UE may receive, from a base station (BS), an indicator that indicates whether the UE should transmit the power reservation signal. In this regard, when operating in sidelink mode 1, each of the UEs intending to transmit in respective sub-slots of a slot may receive an indicator from the BS indicating whether to transmit a power reservation signal during the AGC symbol (e.g., the leading symbol, symbol index 0) of the slot-based UEs or not. Each of the UEs intending to transmit in the respective sub-slots may estimate the power level that they will use for transmitting in the respective sub-slots and transmit the power reservation signal using the estimated power level based on receiving the indication from the BS to transmit the power reservation signal. In this regard, the UE may receive the indicator from the BS in an RRC message and/or a DCI message (e.g., a unicast DCI3 message and/or a groupcast DCI3 message).

In some aspects, the UE may receive the indicator based on a network topology. The network topology may include a plurality of UEs, including the UE and the at least one other UE. In this regard, the BS may determine and/or identify a set of sub-slot-based UEs that may cause interference to one or more slot-based UEs. For example, in some instances the BS utilize the spatial relationships between the UEs to identify sub-slot-based UEs that are in closest proximity to a slot-based UEs such that transmissions from those sub-slot-based UEs may cause interference to the slot-based UE. The BS may estimate, based on the spatial relationship and/or distance between the UEs and/or the transmit power of the UEs, which sub-slot-based UEs may cause interference to the slot UE. In this regard, the BS may indicate the IDs of the sub-slot-based UEs that should transmit the power reservation signal. In this regard, the UE may receive the indicator in an RRC message and/or a DCI message (e.g., a unicast DCI3 message and/or a groupcast DCI3 message). In some instances, the BS may indicate the IDs of the sub-slot-based UEs that should refrain from transmitting a power reservation signal.

In some aspects, the UE may receive from a BS, an indicator that indicates the estimated transmit power level associated with at least one sub-slot of the plurality of sub-slots. As described above, the transmit power level of the power reservation signal may be based on an estimated transmit power level associated with a plurality of sub-slots of a slot. When operating in sidelink mode 1, the UE may receive the estimated power level of one or more of the plurality of sub-slots from the BS. The BS may utilize the spatial relationships between the UEs to estimate, based on the distance between the UEs, the power level of the power reservation signal. Additionally or alternatively, the BS may utilize the spatial relationships between the UEs to estimate, based on the distance between the UEs, the power level associated with a plurality of sub-slots of the slot.

In some aspects, the UE may receive, from a BS, an indicator that indicates a frequency associated with at least one sub-slot of the plurality of sub-slots. The UE may transmit, to the at least one other UE, the power reservation signal in the frequency. When operating in sidelink mode 1, the BS may maintain a resource pool indicating the time and frequency resources associated with the sub-slot-based UEs and the slot-based UEs. The UE may receive a message indicating which frequency resource(s) the sub-slot-based UEs should transmit the power reservation signal in. The frequency may include one or more resource elements, subcarriers, subchannels, channels, bands, etc.

Figure 10:
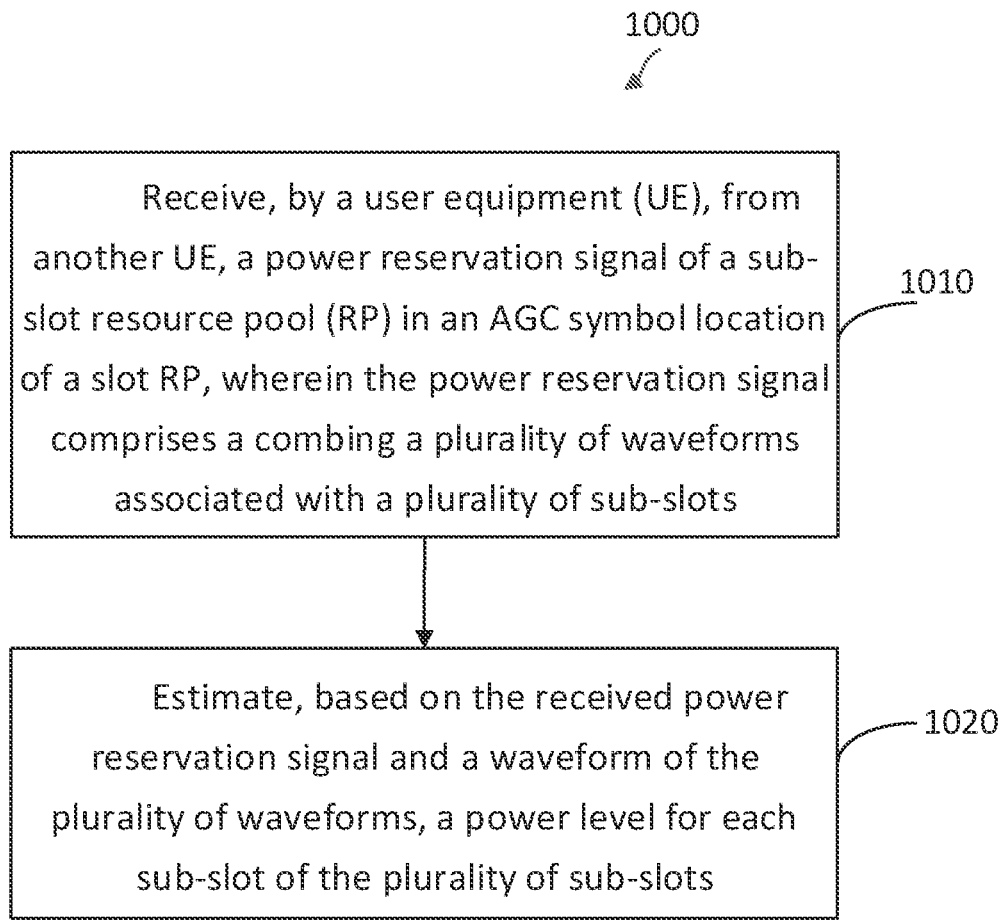
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UE 115 or UE 700, may utilize one or more components, such as the processor 702, the memory 704, the power reservation signal mapping module 708, the transceiver 710, the modem 712, and the one or more antennas 716, to execute aspects of method 1000. The method 1000 may employ similar mechanisms as in the networks 100 and 200 and the aspects and actions described with respect to FIGS. 2-6. As illustrated, the method 1000 includes a number of enumerated steps, but the method 1000 may include additional steps before, after, and in between the enumerated steps. In some aspects, one or more of the enumerated steps may be omitted or performed in a different order.

At 1010, the method 1000 includes a UE (e.g., the UE 115 or the UE 700) receiving, from another UE, a power reservation signal of a sub-slot resource pool (RP) in an AGC symbol location of a slot RP, wherein the power reservation signal comprises a combing of a plurality of waveforms associated with a plurality of sub-slots. In some aspects, a slot may be partitioned into multiple sub-slots. Each of the sub-slots may be used by a different sub-slot supporting UE to transmit a TB to a receiving UE that supports the sub-slot structure. Each sub-slot of the plurality of sub-slots of the slot may include an AGC symbol in the leading symbol (e.g., the earliest symbol in time) that may be used to set the gain control of the receiving UE's receiver or a receiver portion of a transceiver. In some aspects, only the leading sub-slot of the plurality of sub-slots of the slot may include an AGC symbol and each of the sub-slot receiving UEs may use the AGC symbol in the leading sub-slot to set the gain of the receiver or a receiver portion of a transceiver. The AGC symbol of the leading sub-slot may be located in the leading symbol of the leading sub-slot. In the case in which only the leading sub-slot of the slot includes an AGC symbol, the following sub-slots (e.g., the non-leading sub-slots) may omit the AGC symbol and locate a PSCCH and/or a PSSCH in place of the AGC symbol. By replacing the AGC symbol in the non-leading sub-slot with a PSCCH and/or a PSSCH, the UE may increase the number of symbols in the sub-slot available for carrying a TB compared to sub-slots that include an AGC symbol, thereby increasing the capacity of the wireless network.

In some aspects, each of the UEs intending to transmit in respective sub-slots of the slot may transmit a power reservation signal during the AGC symbol (e.g., the leading symbol, symbol index 0) of the slot-based UE. Each of the slot-based UEs intending to transmit in respective sub-slots of the slot may estimate the power level that they will transmit at in the sub-slot and transmit the power reservation signal in the leading symbol of the slot using the estimated power level. In some aspects, each of the UEs intending to transmit in respective sub-slots of the slot may transmit the power reservation signal in a subset of resource elements in the leading symbol. In some aspects, the sub-slot-based UE may receive, from a base station (BS), an indicator that indicates the resources the sub-slot-based UE may use to transmit the power reservation signal. In this regard, the sub-slot-based UE may receive the indicator from the BS in an RRC message and/or a DCI message (e.g., a unicast DCI3 message and/or a groupcast DCI3 message). The sub-slot-based UE may receive the power reservation signal in the leading sub-slot. The sub-slot-based UE may determine a gain setting for its receiver or a receiver portion of its transceiver based on the power reservation signal.

At 1020, the method 1000 includes the UE (e.g., the UE 115 or the UE 700) estimating, based on the received power reservation signal and/or a waveform of the plurality of waveforms, a power level (e.g., reference signal received power level) for each sub-slot of the plurality of sub-slots. For example, the sub-slot-based receiving UE may determine the power levels from all the sub-slot-based transmitting UEs and determine the power level of the i sub-slot-based UE scheduled to transmit to the sub-slot-based receiving UE by cross correlating the power reservation signals 336 of FIGS. 4 and 5. In some aspects, the UE may measure the received power level (e.g., the RSSI) across the slot based and the sub-slot based RP at the AGC symbol location (e.g., symbol number 0). The UE may estimate the reference signal received power of the sub-slot by correlating the known power reservation signal waveform (e.g., Chu sequence, Gold sequence, etc.) with the received signal measured at the AGC symbol location. The total received power minus the estimated sub-slot power will be the received power from the slot based RP.

For example, the sub-slot-based receiving UE may utilize a combing scheme (e.g., the specific REs in the power reservation signal that the sub-slot UEs are mapped to) and/or the waveform (e.g., Chu sequence, Gold sequence, etc.) of the power reservation signal. The sub-slot-based UE may be able to determine the power level of the UE scheduled to transmit to the sub-slot-based receiving UE based on the combing scheme and/or waveform. In some aspects, cross correlating the power reservation signals in the leading sub-slot may facilitate the sub-slot-based receiving UE to distinguish interference and/or unwanted signals (e.g., WiFi signals, other transmitting UEs) from the power reservation signal of the sub-slot-based UE scheduled to transmit. In this regard, the sub-slot-based UE may distinguish the WiFi interference based on the waveform. The sub-slot-based UE may distinguish the sub-slot-based transmitting UE based on the combing scheme.

In some aspects, the sub-slot-based UE (e.g., the sub-slot-based receiving UE) may measure the power level of the power reservation signal in the leading sub-slot and calculate a gain control power level for the UE's receiver or receiver portion of a transceiver by subtracting the estimated power level of each sub-slot of the plurality of sub-slots from the measured power level of the power reservation signal. The sub-slot-based UE may set a gain control of a receiver or a receiver portion of a transceiver of the sub-slot-based UE based on the calculated gain control power level. The power measured by the sub-slot-based UE may include power from the slot-based UE transmitters and the sub-slot-based UE transmitters. By subtracting the estimated power level of each sub-slot of the plurality of sub-slots from the measured power level, the sub-slot-based UE may determine the interference from the slot-based UE transmitters and set a gain control of a receiver or a receiver portion of a transceiver of the sub-slot-based UE based on the level of interference.

Figure 11:
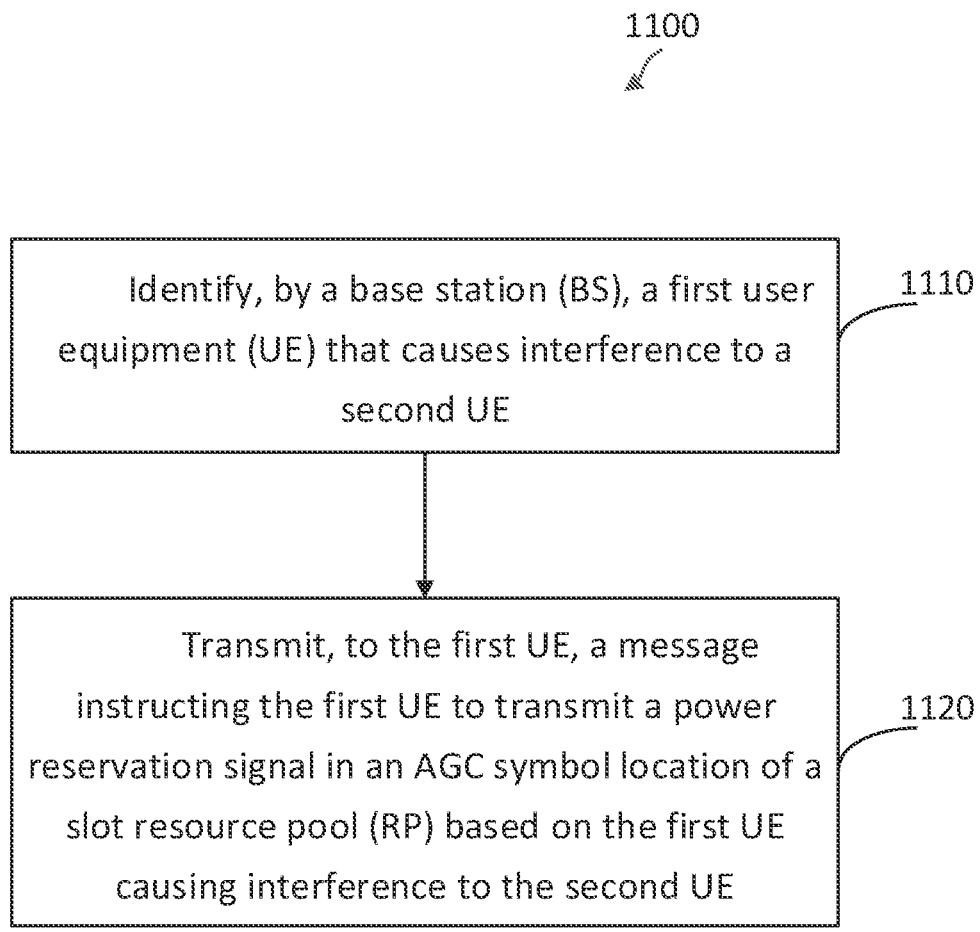
FIG. 11 is a flow diagram of a communication method according to some aspects of the present disclosure.

FIG. 11 is a flow diagram of a communication method 1000 according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as the BS 105 or BS 800, may utilize one or more components, such as the processor 802, the memory 804, the power reservation signal mapping module 808, the transceiver 810, the modem 812, and the one or more antennas 816, to execute aspects of method 1100. The method 1100 may employ similar mechanisms as in the networks 100 and 200 and the aspects and actions described with respect to FIGS. 2-6. As illustrated, the method 1100 includes a number of enumerated steps, but the method 1100 may include additional steps before, after, and in between the enumerated steps. In some aspects, one or more of the enumerated steps may be omitted or performed in a different order.

At 1110, the method 1100 includes the BS (e.g., the BS 105 or the BS 800) identifying a first UE that causes interference to a second UE. In some aspects, the BS may identify the first UE causing interference to the second UE based on a network topology. The network topology may include a plurality of UEs, including the first UE and the second UE. For example, the BS and the first and second UE may be operating in sidelink mode 1 in which the first UE and the second UE are connected to the BS. For example, in some instances, the BS may utilize the physical topology of the network. The physical topology of the network may include the distances between the UEs. The interference caused by the first UE to the second UE may be based on the distance between the first UE and the second UE. The interference caused by the first UE to the second UE may increase as the distance between the first UE and the second UE decreases. For example, in some instances the BS utilize the spatial relationships between the UEs to identify sub-slot-based UEs that are in closest proximity to a slot-based UEs such that transmissions from those sub-slot-based UEs may cause interference to the slot-based UE. The BS may determine the network topology using any method. For example, the BS may receive a location of the sub-slot-based UE and/or the slot-based UE from the sub-slot-based UE and the slot-based UE respectively. In this regard, the BS may receive GPS coordinates from the sub-slot-based and/or the slot-based UE. Additionally or alternatively, the BS may determine the distance between the sub-slot-based UE and the slot-based UE based on triangulation methods using signal strength measurements of the sub-slot-based UE, and the slot-based UE from other nodes in the network.

At 1110, the method 1100 includes the BS (e.g., the BS 105 or the BS 800) transmitting, to the first UE, a message instructing the first UE to transmit a power reservation signal in an AGC symbol location of a slot RP based on the first UE causing interference to the second UE. In this regard, the BS may transmit the message via at least one of a unicast DCI3 message or a multicast DCI3 message. The BS may determine that the first UE (e.g., the sub-slot-based UE) may cause interference to the second UE (e.g., the slot-based UE) above a threshold. The BS may transmit the message based on the interference being above the threshold. In some aspects, the BS may instruct the sub-slot-based UE to transmit a power reservation signal in an AGC location of a slot RP (e.g., a leading symbol location) according to the methods described above with reference to FIG. 9.

By way of non-limiting examples, the following aspects are included in the present disclosure.

Aspect 1 includes a method of wireless communication performed by a user equipment (UE), the method comprising mapping a power reservation signal of a sub-slot resource pool (RP) to an AGC symbol location of a slot RP; and transmitting, to at least one other UE, the power reservation signal, wherein a transmit power level of the power reservation signal is based on an estimated transmit power level associated with at least one sub-slot.

Aspect 2 includes the method of aspect 1, wherein the mapping the power reservation signal of the sub-slot RP to the AGC symbol location of the slot RP comprises mapping the power reservation signal to a leading sub-slot.

Aspect 3 includes the method of any of aspects 1-2, wherein the transmit power level of the power reservation signal is based on an estimated transmit power level associated with a plurality of sub-slots.

Aspect 4 includes the method of any of aspects 1-3, further comprising receiving, from a base station (BS), an indicator that indicates whether the UE should transmit the power reservation signal.

Aspect 5 includes the method of any of aspects 1-4, wherein the receiving the indicator comprises receiving the indicator via at least one of a unicast DCI3 message or a multicast DCI3 message.

Aspect 6 includes the method of any of aspects 1-5, wherein the indicator is based on a network topology including the UE and the at least one other UE.

Aspect 7 includes the method of any of aspects 1-6, wherein the indicator is based on a distance between the UE and the at least one other UE.

Aspect 8 includes the method of any of aspects 1-7, further comprising receiving, from a base station (BS), an indicator that indicates the estimated transmit power level associated with the at least one sub-slot.

Aspect 9 includes the method of any of aspects 1-8, further comprising receiving, from a base station (BS), an indicator that indicates a frequency associated with the at least one sub-slot; and wherein the transmitting the power reservation signal comprises transmitting, to the at least one other UE, the power reservation signal in the frequency.

Aspect 10 includes the method of any of aspects 1-9, wherein a waveform of the power reservation signal comprises at least one of a low peak to average power ratio waveform; a Chu sequence waveform; a Gold sequence waveform; or a waveform of a first symbol of the sub-slot.

Aspect 11 includes the method of any of aspects 1-10, wherein the mapping the power reservation signal of the sub-slot RP to the AGC symbol location of the slot RP comprises mapping the power reservation signal based on at least one of a combing of a plurality of waveforms associated with a plurality of sub-slots; or a cyclic shifting of the plurality of waveforms associated with the plurality of sub-slots.

Aspect 12 includes the method of any of aspects 1-11, wherein the combing is based on a frequency division multiplexing of the waveforms associated with the plurality of sub-slots.

Aspect 13 includes a method of wireless communication performed by a user equipment (UE), the method comprising receiving, from another UE, a power reservation signal of a sub-slot resource pool (RP) in an AGC symbol location of a slot RP, wherein the power reservation signal comprises a combing a plurality of waveforms associated with a plurality of sub-slots; and setting, based on the power reservation signal, a gain control of a receiver or a receiver portion of a transceiver of the UE.

Aspect 14 includes the method of aspect 13, further comprising estimating, based on the received power reservation signal and a waveform of the plurality of waveforms, a power level for each sub-slot of the plurality of sub-slots.

Aspect 15 includes the method of any of aspects 13-14, further comprising setting, based on the estimated power level of a sub-slot associated with a transmission to the UE, a gain control of a receiver or a receiver portion of a transceiver of the UE.

Aspect 16 includes the method of any of aspects 13-15, further comprising receiving, from the other UE, a physical sidelink control channel (PSCCH) signal in a leading symbol of at least one sub-slot of the plurality of sub-slots.

Aspect 17 includes the method of any of aspects 13-16, further comprising measuring a power level of the power reservation signal; and calculating a gain control power level by subtracting the estimated power level of each sub-slot of the plurality of sub-slots from the power level of the power reservation signal; and setting a gain control of a receiver or a receiver portion of a transceiver of the UE based on the gain control power level.

Aspect 18 includes a method of wireless communication performed by a base station (BS), the method comprising identifying a first user equipment (UE) that causes interference to a second UE; and transmitting, to the first UE, a message instructing the first UE to transmit a power reservation signal in an AGC symbol location of a slot resource pool (RP) based on the first UE causing interference to the second UE.

Aspect 19 includes the method of aspect 18, wherein the identifying the first UE comprises identifying the first UE based on a network topology including the first UE and the second UE.

Aspect 20 includes the method of any of aspects 18-19, wherein the identifying the first UE comprises identifying the first UE based on a distance between the first UE and the second UE.

Aspect 21 includes the method of any of aspects 18-20, wherein the transmitting the message instructing the first UE to transmit the power reservation signal comprises transmitting the message via at least one of a unicast DCI3 message or a multicast DCI3 message.

Aspect 22 includes a user equipment (UE) comprising a transceiver, a memory, and a processor coupled to the transceiver and the memory, the UE configured to perform any one of aspects 1-12.

Aspect 23 includes a user equipment (UE) comprising a transceiver, a memory, and a processor coupled to the transceiver and the memory, the UE configured to perform any one of aspects 13-17.

Aspect 24 includes a base station (BS) comprising a transceiver, a memory, and a processor coupled to the transceiver and the memory, the BS configured to perform any one of aspects 18-21.

Aspect 29 includes a non-transitory computer-readable medium storing one or more instructions for wireless communication, the one or more instructions comprising one or more instructions that, when executed by one or more processors of a user equipment, cause the one or more processors to perform any one of aspects 1-12.

Aspect 30 includes a non-transitory computer-readable medium storing one or more instructions for wireless communication, the one or more instructions comprising one or more instructions that, when executed by one or more processors of a user equipment, cause the one or more processors to perform any one of aspects 13-17.

Aspect 31 includes a non-transitory computer-readable medium storing one or more instructions for wireless communication, the one or more instructions comprising one or more instructions that, when executed by one or more processors of a base station, cause the one or more processors to perform any one of aspects 18-21.

Aspect 32 includes a user equipment (UE) comprising one or more means to perform any one or more of aspects 1-12.

Aspect 33 includes a user equipment (UE) comprising one or more means to perform any one or more of aspects 13-17.

Aspect 34 includes a base station (BS) comprising one or more means to perform any one or more of aspects 18-21.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
    mapping a power reservation signal of a sub-slot resource pool (RP) to an automatic gain control (AGC) symbol location of a slot RP, wherein the sub-slot RP partitions one or more slots into a plurality of sub-slots each occupying multiple symbols; and
    transmitting, to at least one other UE, the power reservation signal, wherein a transmit power level of the power reservation signal is based on an estimated transmit power level associated with at least one sub-slot of the plurality of sub-slots.

2. The method of claim 1, wherein the mapping the power reservation signal of the sub-slot RP to the AGC symbol location of the slot RP comprises mapping the power reservation signal to a leading sub-slot.

3. The method of claim 1, wherein the transmit power level of the power reservation signal is based on an estimated transmit power level associated with the plurality of sub-slots.

4. The method of claim 1, further comprising:
    receiving, from a base station (BS), an indicator that indicates whether the UE should transmit the power reservation signal.

5. The method of claim 4, wherein the receiving the indicator comprises receiving the indicator via at least one of a unicast downlink control information (DCI) message or a multicast DCI message.

6. The method of claim 4, wherein the indicator is based on a network topology including the UE and the at least one other UE.

7. The method of claim 4, wherein the indicator is based on a distance between the UE and the at least one other UE.

8. The method of claim 1, further comprising:
    receiving, from a base station (BS), an indicator that indicates the estimated transmit power level associated with the at least one sub-slot.

9. The method of claim 1, further comprising:
    receiving, from a base station (BS), an indicator that indicates a frequency associated with the at least one sub-slot; and
    wherein the transmitting the power reservation signal comprises:
        transmitting, to the at least one other UE, the power reservation signal in the frequency.

10. The method of claim 1, wherein a waveform of the power reservation signal comprises at least one of:
    a low peak to average power ratio waveform;
    a Chu sequence waveform;
    a Gold sequence waveform; or
    a waveform of a first symbol of the sub-slot.

11. The method of claim 1, wherein the mapping the power reservation signal of the sub-slot RP to the AGC symbol location of the slot RP comprises:
    mapping the power reservation signal based on at least one of:
        a combing of a plurality of waveforms associated with the plurality of sub-slots; or
        a cyclic shifting of the plurality of waveforms associated with the plurality of sub-slots.

12. The method of claim 11, wherein the combing is based on a frequency division multiplexing of the waveforms associated with the plurality of sub-slots.

13. A method of wireless communication performed by a user equipment (UE), the method comprising:
    receiving, from another UE, a power reservation signal of a sub-slot resource pool (RP) in an automatic gain control (AGC) symbol location of a slot RP, wherein, the sub-slot RP partitions one or more slots into a plurality of sub-slots each occupying multiple symbols and the power reservation signal comprises a combing of a plurality of waveforms associated with the plurality of sub-slots; and
    setting, based on the power reservation signal, a gain control of a receiver or a receiver portion of a transceiver of the UE.

14. The method of claim 13, further comprising:
    estimating, based on the received power reservation signal and a waveform of the plurality of waveforms, a power level for each sub-slot of the plurality of sub-slots.

15. The method of claim 14, further comprising:
    setting, further based on the estimated power level, the gain control of the receiver or a receiver portion of the transceiver of the UE.

16. The method of claim 13, further comprising receiving, from the other UE, a physical sidelink control channel (PSCCH) signal in a leading symbol of at least one sub-slot of the plurality of sub-slots.

17. The method of claim 13, further comprising:
  measuring a power level of the power reservation signal;
  calculating a gain control power level by subtracting the estimated power level of each sub-slot of the plurality of sub-slots from the power level of the power reservation signal; and
  setting the gain control of the receiver or the receiver portion of the transceiver of the UE further based on the gain control power level.

18. A method of wireless communication performed by a base station (BS), the method comprising:
  identifying a first user equipment (UE) that causes interference to a second UE; and
  transmitting, to the first UE, a message instructing the first UE to transmit a power reservation signal in an automatic gain control (AGC) symbol location of a sub-slot resource pool (RP) based on the first UE causing interference to the second UE, wherein the sub-slot RP partitions one or more slots into a plurality of sub-slots each occupying multiple symbols.

19. The method of claim 18, wherein the identifying the first UE comprises:
  identifying the first UE based on a network topology including the first UE and the second UE.

20. The method of claim 18, wherein the identifying the first UE comprises:
  identifying the first UE based on a distance between the first UE and the second UE.

21. The method of claim 18, wherein the transmitting the message instructing the first UE to transmit the power reservation signal comprises:
  transmitting the message via at least one of a unicast downlink control information (DCI) message or a multicast DCI message.

22. A user equipment (UE) comprising:
  a transceiver, a memory, and a processor coupled to the transceiver and the memory, the UE configured to:
    map a power reservation signal of a sub-slot resource pool (RP) to an automatic gain control (AGC) symbol location of a slot RP, wherein the sub-slot RP partitions one or more slots into a plurality of sub-slots each occupying multiple symbols; and
    transmit, to at least one other UE, the power reservation signal, wherein a transmit power level of the power reservation signal is based on an estimated transmit power level associated with at least one sub-slot of the plurality of sub-slots.

23. The UE of claim 22, wherein the UE is further configured to map the power reservation signal of the sub-slot RP to a leading sub-slot.

24. The UE of claim 22, wherein the transmit power level of the power reservation signal is further based on an estimated transmit power level associated with the plurality of sub-slots.

25. The UE of claim 22, wherein the UE is further configured to:
  receive, from a base station (BS), an indicator that indicates whether the UE should transmit the power reservation signal.

26. The UE of claim 25, wherein the indicator is based on at least one of:
  a distance between the UE and the at least one other UE; or
  a network topology including the UE and the at least one other UE.

27. The UE of claim 22, wherein the UE is further configured to:
  receive, from a base station (BS), an indicator that indicates the estimated transmit power level associated with the at least one sub-slot.

28. The UE of claim 27, wherein the UE is further configured to map the power reservation signal based on at least one of:
  a combing of a plurality of waveforms associated with the plurality of sub-slots; or
  a cyclic shifting of the plurality of waveforms associated with the plurality of sub-slots.

29. The UE of claim 22, wherein the UE is further configured to:
  receive, from a base station (BS), an indicator that indicates a frequency associated with the at least one sub-slot; and
  transmit, to the at least one other UE, the power reservation signal in the frequency.

30. The UE of claim 22, wherein a waveform of the power reservation signal comprises at least one of:
  a low peak to average power ratio waveform;
  a Chu sequence waveform;
  a Gold sequence waveform; or
  a waveform of a first symbol of the sub-slot.

* * * * *